(12) United States Patent
Nakajima

(10) Patent No.: US 6,995,885 B2
(45) Date of Patent: Feb. 7, 2006

(54) VIBRATING MIRROR, OPTICAL SCANNER USING VIBRATING MIRROR, AND IMAGE REPRODUCING AND FORMING APPARATUS

(75) Inventor: Tomohiro Nakajima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/878,365

(22) Filed: Jun. 29, 2004

(65) Prior Publication Data

US 2005/0030606 A1  Feb. 10, 2005

(30) Foreign Application Priority Data

Jun. 30, 2003  (JP)  ............................. 2003-188161

(51) Int. Cl.
 *G02B 26/08* (2006.01)
(52) U.S. Cl. ...................................... 359/198; 359/223
(58) Field of Classification Search ................ 359/198, 359/199, 223–226
 See application file for complete search history.

(56) References Cited

U.S. PATENT DOCUMENTS

| | | | |
|---|---|---|---|
| 4,853,710 A | 8/1989 | Shimada et al. |
| 4,869,582 A | 9/1989 | Nakajima et al. |
| 4,932,732 A | 6/1990 | Nakajima |
| 4,953,171 A | 8/1990 | Nakajima et al. |
| 5,018,806 A | 5/1991 | Nakajima |
| 5,063,409 A | 11/1991 | Nakajima |
| 5,128,699 A | 7/1992 | Nakajima et al. |
| 5,633,744 A | 5/1997 | Nakajima |
| 5,671,077 A | 9/1997 | Imakawa et al. |
| 5,753,907 A | 5/1998 | Nakajima et al. |
| 5,786,594 A | 7/1998 | Ito et al. |
| 5,793,408 A | 8/1998 | Nakajima |
| 5,926,203 A | 7/1999 | Shimura et al. |
| 5,936,756 A | 8/1999 | Nakajima |
| 5,999,345 A | 12/1999 | Nakajima et al. |
| 6,052,211 A | 4/2000 | Nakajima |
| 6,091,534 A | 7/2000 | Nakajima |
| 6,236,820 B1 | 5/2001 | Nakazato et al. |
| 6,400,917 B2 | 6/2002 | Nakazato et al. |
| 6,466,754 B2 | 10/2002 | Nakazato et al. |
| 6,580,887 B2 | 6/2003 | Nakazato et al. |
| 6,621,512 B2 | 9/2003 | Nakajima et al. |
| 6,657,765 B2 | 12/2003 | Hayashi et al. |
| 6,690,404 B2 | 2/2004 | Shimada et al. |
| 6,697,588 B2 | 2/2004 | Nakazato et al. |
| 6,760,557 B2 | 7/2004 | Nakazato et al. |
| 6,768,886 B2 | 7/2004 | Nakazato et al. |
| 6,775,041 B1 | 8/2004 | Nakajima |
| 2002/0171878 A1 | 11/2002 | Nakajima |

FOREIGN PATENT DOCUMENTS

| | | |
|---|---|---|
| JP | 5-153338 | 6/1993 |
| JP | 2924200 | 5/1999 |
| JP | 3011144 | 12/1999 |
| JP | 2001-249300 | 9/2001 |
| JP | 2002-258183 | 9/2002 |
| JP | 2003-15064 | 1/2003 |
| JP | 2003-503754 | 1/2003 |

*Primary Examiner*—Euncha P. Cherry
(74) *Attorney, Agent, or Firm*—Oblon, Spivak, McClelland, Maier & Neustadt, P.C.

(57) ABSTRACT

A vibrating mirror comprises a moving mirror configured to deflect a light beam, a torsion bar coupled to the moving mirror and defining a rotational axis of the moving mirror, and a mirror driving part configured to produce a rotational force for causing the moving mirror to oscillate, wherein the torsion bar is coupled to the moving mirror at connecting positions offset from the rotational axis by a distance r/2 in opposite directions so as to satisfy r>A/6, where A is the width of the moving mirror perpendicular to the rotational axis.

14 Claims, 21 Drawing Sheets

FIG.4B
2ND SUBSTRATE
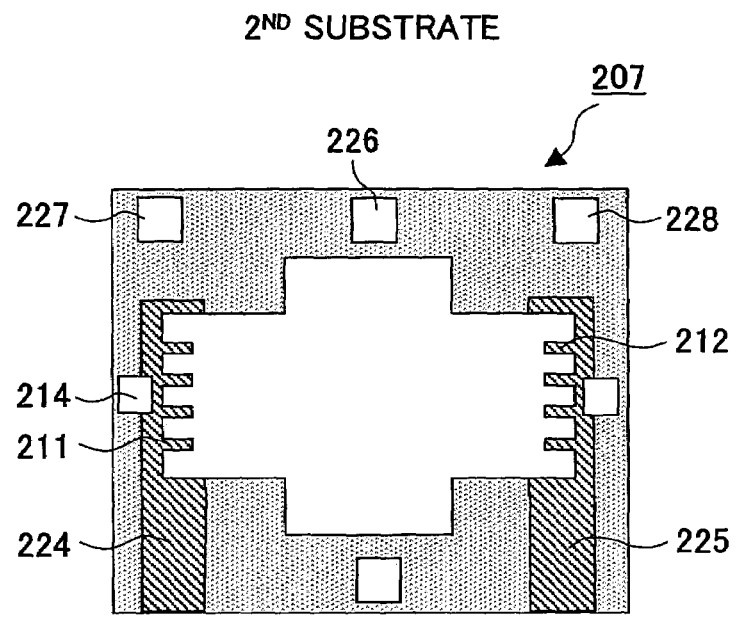
1ST SUBSTRATE
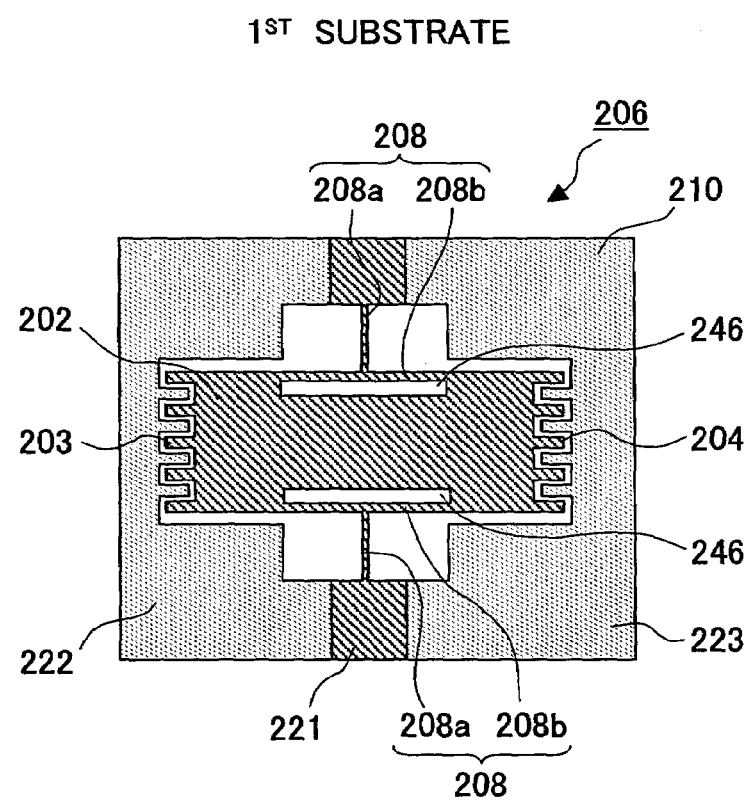

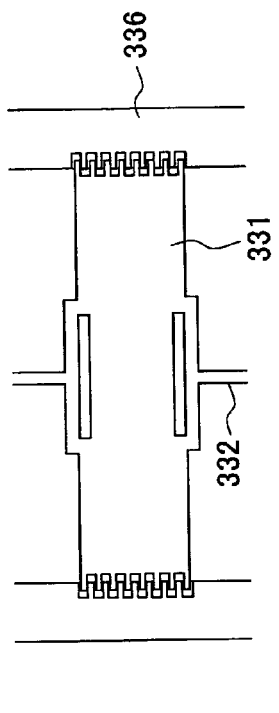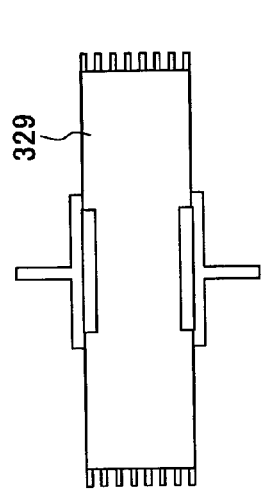
FIG.14A
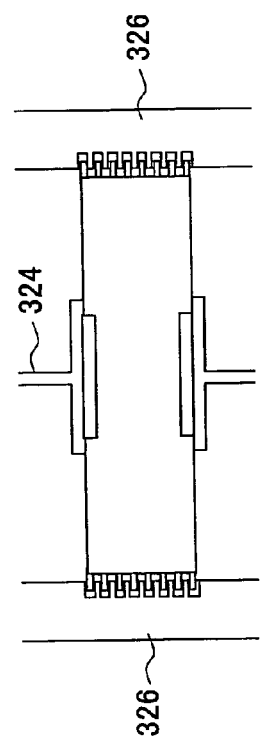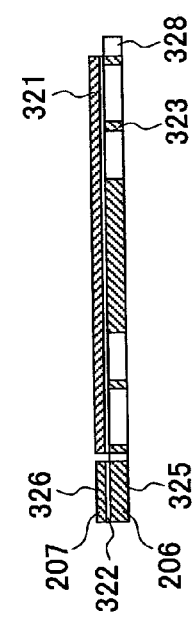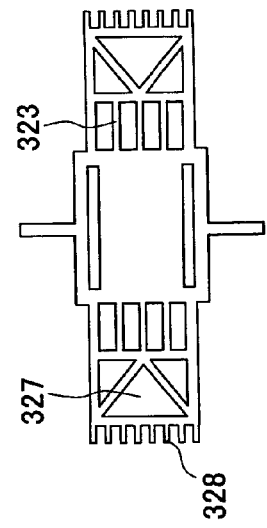
FIG.14B $D = (k + 1/n)p$ $\Delta T1 = k \cdot T$ $\Delta T1 = T/n$

VIBRATING MIRROR, OPTICAL SCANNER USING VIBRATING MIRROR, AND IMAGE REPRODUCING AND FORMING APPARATUS

BACKGROUND OF THE INVENTION

1. Field of the Invention

The present invention relates to a vibrating mirror (or a deflecting mirror) used in, for example, optical scanners, optical-scan display devices, or in-vehicle laser radars. The present invention also relates to an optical scanner with a vibrating mirror, and to an image reproducing/forming apparatus, such as digital copying machines, laser printers, laser plotters, laser facsimile machines, etc., employing the optical scanner.

2. Description of Related Art

In conventional optical scanners, polygon mirrors or galvanometer mirrors are used to deflect beams for writing images. In order to achieve high-resolution high-speed printing operations, the rotational speed of these mirrors has to be increased. However, there is a ceiling to increasing the rotational speed of the mirror because of various reasons, such as limitation in durability of the bearings, heat generation due to windage, and noise.

On the other hand, optical deflectors making use of micromachining of silicon have been researched and studied. For example, JP 4-211218A and JP 11-52278A, which issued as Japanese Patent Nos. 2924200 and 3011144, respectively, disclose a technique for monolithically and integrally fabricating a vibrating mirror, together with a torsion bar supporting the mirror on its axis, from a silicon substrate. One of the advantages of the integrally fabricated vibrating mirror with the torsion bar is that the reciprocating motion of the mirror is produced by resonance, and that high-speed operation is achieved. In addition, noise and power consumption are reduced because less driving force is required to swing the vibrating mirror.

However, this type of vibrating mirror is incapable of deflecting a light beam over a wide range, unlike the conventional polygon mirror, because the size of the mirror surface and the sweep angle are small. To overcome this problem, JP 2002-258183A proposes to arrange multiple optical scanning units, each using a vibrating mirror as a deflector, such that the scanning directions of the optical scanning units align with each other in the fast scan direction. Under this structure, the entire imaging range (or the writing range) is divided into several sections along the scanning line.

In general, as the mirror surface becomes large, the mass increases and the sweep angle decreases. This is because the force of inertia acts on the end portions of the mirror opposite to the rotational force acting on the torsion bar. The viscosity resistance of the air acting on the mirror surface also narrows the sweep angle.

JP 2001-249300A proposes to arrange hollow areas or recesses on the rear side of the mirror substrate to reduce the mass. JP 5-153338A proposes to place the vibrating mirror in a vacuum vessel and seal up the vessel in order to reduce the viscosity resistance and the driving voltage. On the other hand, JP 2003-15064A and JP 2003-503754A propose to couple the torsion bar to the mirror substrate at several positions for the purpose of preventing the mirror from vibrating in directions other than the direction of rotation.

The technique of dividing the entire imaging region into several sections in the fast scan direction is advantageous because each of the optical scanning units can be made compact, reducing the scanning width and the optical path length. Accordingly, a low-noise and power-saving image reproducing/forming apparatus is realized, using micromirrors capable of low-load optical scan. However, when the dimensions of the mirror surface are increased, the rotational force for driving the mirror has to be increased to guarantee the sweep angle against the increased force of inertia.

The mirror substrate is as thin as 100 $\mu$m. The force of inertia acting on the mirror increases as the working point separates from the rotational axis (or approaches the mirror end), and shearing stress is generated in the mirror substrate against the rotational force propagating from the torsion bar. As a result, the mirror surface bends in a sinusoidal curve and the surface accuracy is degraded.

The force of inertia acting on the mirror substrate increases as the mirror angle (sweep angle) approaches the maximum because the negative acceleration applied on the mirror substrate increases. The wider the sweep angle, the less the surface accuracy is.

To guarantee surface accuracy, the effective scan ratio, that is, the ratio of the actual sweep angle employed in image formation to the maximum sweep angle, has to be reduced. This is one of the factors that makes it difficult to increase the sweep angle to extend the imaging range even under an increased rotational force applied to the mirror. The number of divided sections along the scanning line may be increased to compensate for the limited sweep angle; however, this results in undesirable increased cost.

FIG. 1 is a schematic diagram illustrating the effect arising when the light flux is incident on the curved surface of the mirror. In reality, the quantity of the curvature on the mirror surface is at the wavelength level, and is sufficiently small with respect to the tilt of the mirror surface. The drawing is rather exaggerated.

It is assumed that a single light flux 353 with a rectangular cross-section is incident on the mirror surface covering the crest 351 and the trough 352. In this illumination area, the radius of curvature of the mirror surface varies in the fast scan direction. The focusing point of the light flux component 355 having been reflected from the crest 351 goes away from the focusing point of the light flux component 354 reflected from the center of the mirror, due to the convex mirror effect. To the contrary, the focusing point of the light flux component 356 reflected from the trough 352 comes closer due to the concave lens effect. Since the light flux is divided into different portions when reflected from an uneven surface, the profile (intensity distribution) 357 of the beam spot on the scanned plane has a side lobe with wide skirt. This phenomenon causes the image to blur, reduces the resolution, and degrades the image quality.

SUMMARY OF THE INVENTION

It is an object of the present invention to overcome the above-described problems in the prior art, and to provide a vibrating mirror that can prevent dynamically arising waves and maintain the flatness of the mirror surface so as to achieve satisfactory imaging performance.

It is another object of the invention to provide an optical scanner using the vibrating mirror.

It is still another object of the invention to provide an image reproducing/forming apparatus employing the optical scanner.

To achieve the above-described object, in one aspect of the invention, a vibrating mirror comprises a moving mirror configured to deflects a light beam, a torsion bar coupled to the moving mirror and defining the rotational axis of the moving mirror, and mirror driving means that produces a rotational force to cause the moving mirror to oscillate about the rotational axis, wherein the torsion bar is coupled to the moving mirror at connecting positions offset from the rotational axis by r/2 in opposite directions so as to satisfy r>A/6 where A is the width of the moving mirror perpendicular to the rotational axis.

This arrangement can prevent deformation of the mirror substrate of a vibrating mirror by dispersing the points of application of the rotational force propagating from the torsion bar toward the periphery of the mirror so as to bring them near the center of the distribution of the inertial force.

In one example, the torsion bar has a first portion that defines the rotational axis of the moving mirror and a second portion branching from the first portion to the connecting positions.

In another example, the moving mirror is formed of a first substrate defining a reflecting surface, and a second substrate bonded to the first substrate and to which the torsion bar is coupled.

This arrangement can improve the rigidity of the mirror substrate against deformation by means of tension of the bonded surfaces.

In yet another aspect of the invention, a vibrating mirror module is provided. The vibrating mirror module comprises a vibrating mirror and a housing accommodating the vibrating mirror and sealed up so as to maintain a pressure in the housing at least lower than atmospheric pressure, the vibrating mirror including a moving mirror configured to deflect a light beam, a torsion bar coupled to the moving mirror and defining a rotational axis of the moving mirror, and a mirror driving part configured to produce a rotational force for causing the moving mirror to oscillate, the torsion bar being coupled to the moving mirror at connecting positions offset from the rotational axis by a distance r/2 in opposite directions so as to satisfy r>A/6, where A is the width of the moving mirror perpendicular to the rotational axis.

The arrangement can reduce the viscosity resistance of the air and maintain the imaging performance of the deflected beam high.

In yet another aspect of the invention, an optical scanning unit is provided. The optical scanning unit comprises a light source that emits a light beam, a vibrating mirror that deflects the light beam over a predetermined range, and an optical system that guides the deflected light beam onto a scanned plane, wherein the vibrating mirror includes a moving mirror configured to deflect the light beam under application of rotational force, and a torsion bar defining a rotational axis of the moving mirror and coupled to the moving mirror at least at two positions separated along a width of the moving mirror by distance "r" so as to satisfy r>A/6 where A is the width of the moving mirror perpendicular to the rotational axis.

This arrangement allows the scanning operation of the optical scanning unit to be conducted with satisfactory intensity distribution of the beam because the surface accuracy of the vibrating mirror is guaranteed. In addition, the scanning range can be widened because the sweep angle that guarantees the surface accuracy is expanded.

In yet another aspect of the invention, an optical scanner using a plurality of above-described optical scanning units is provided. The optical scanning units are arranged such that the scanning range of each of the optical scanning units aligns in the fast scan direction so as to define a scanning line on a scanned plane.

In yet another aspect of the invention, an image reproducing and forming apparatus using the above-described optical unit is provided. The apparatus comprises an image carrier, the optical scanning unit that forms an electrostatic latent image on the image carrier, a developer that develops the electrostatic latent image into a toner image, and transfer means that transfers the toner image onto a recording medium.

BRIEF DESCRIPTION OF THE DRAWINGS

Other objects, features, and advantages of the present invention will become more apparent from the following detailed description when read in conjunction with the accompanying drawings, in which:

FIG. 4 illustrates the detailed structure of the vibrating mirror module used in the optical scanning unit shown in FIG. 2, where FIG. 4A is an exploded view of the vibrating mirror module and FIG. 4B shows the first substrate and the second substrate that structure the vibrating mirror;

FIG. 14A and FIG. 14B show other examples of the moving mirror used in the vibrating mirror module;

DETAILED DESCRIPTION OF THE INVENTION

The preferred embodiments of the present invention are described below with reference to the attached drawings.

Figure 1:
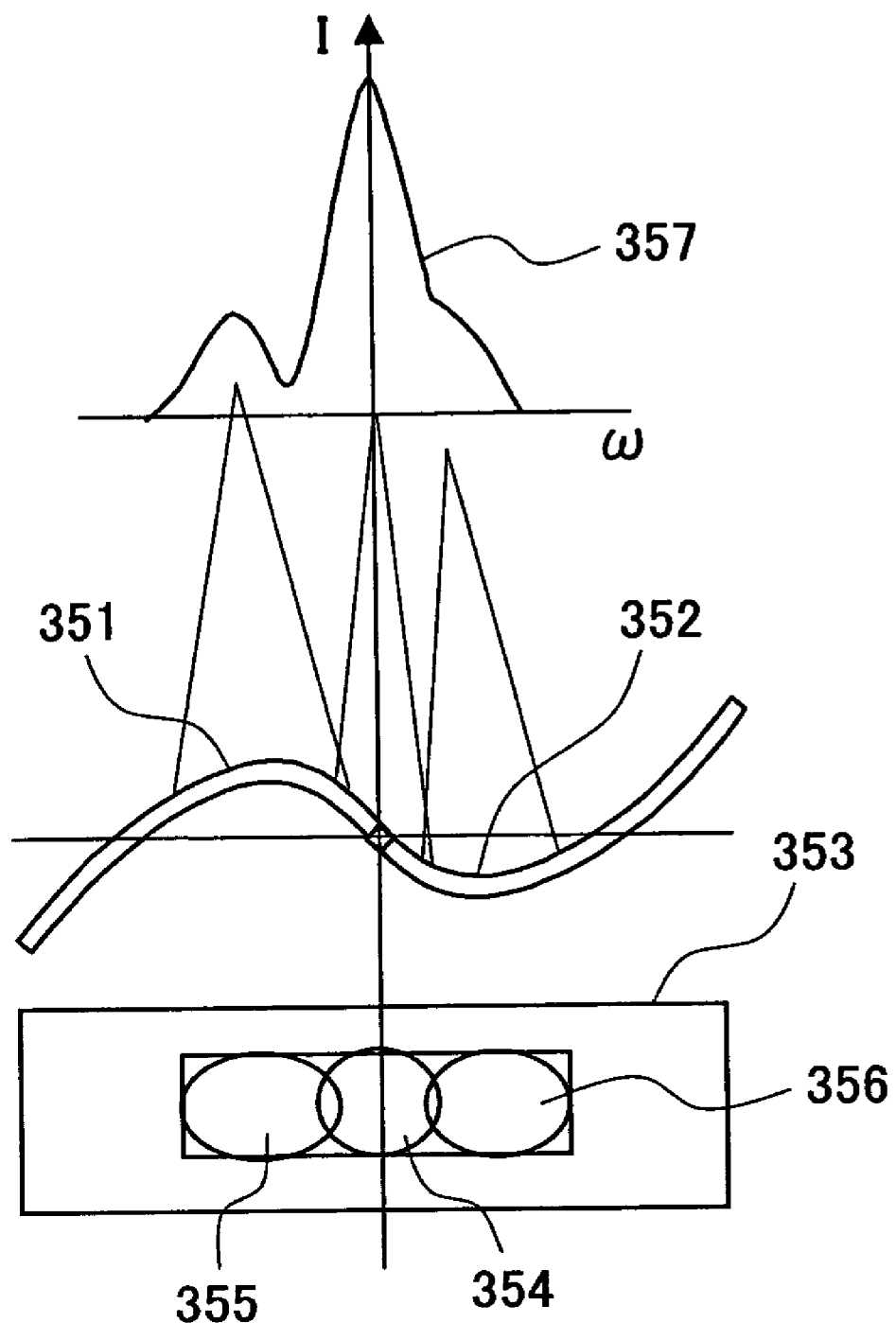
FIG. 1 is a schematic diagram illustrating the adverse effect arising when light flux is incident on a wavy mirror surface.
Figure 2:
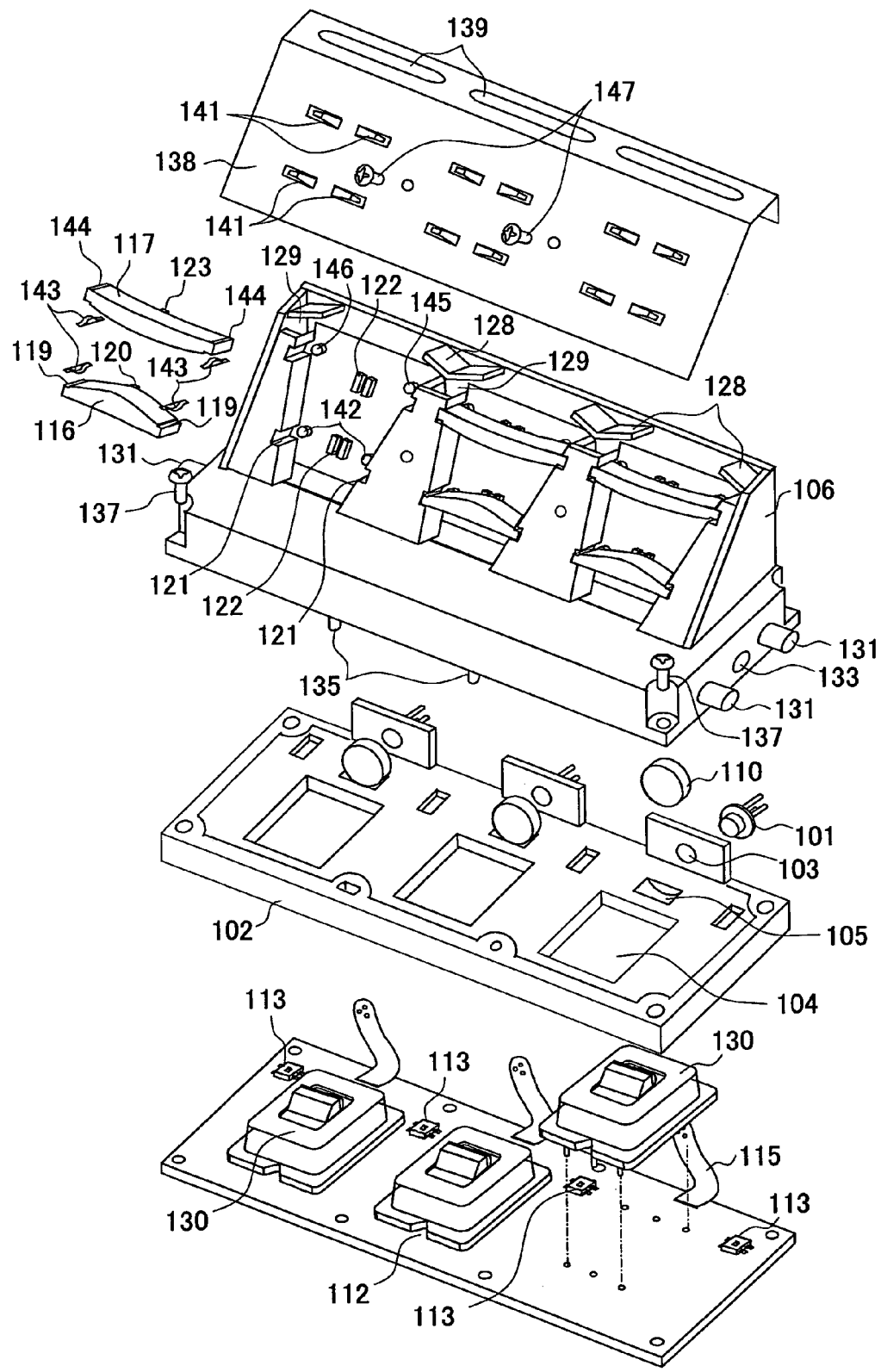
FIG. 2 is an exploded view of an optical scanning unit according to an embodiment of the invention.
Figure 3:
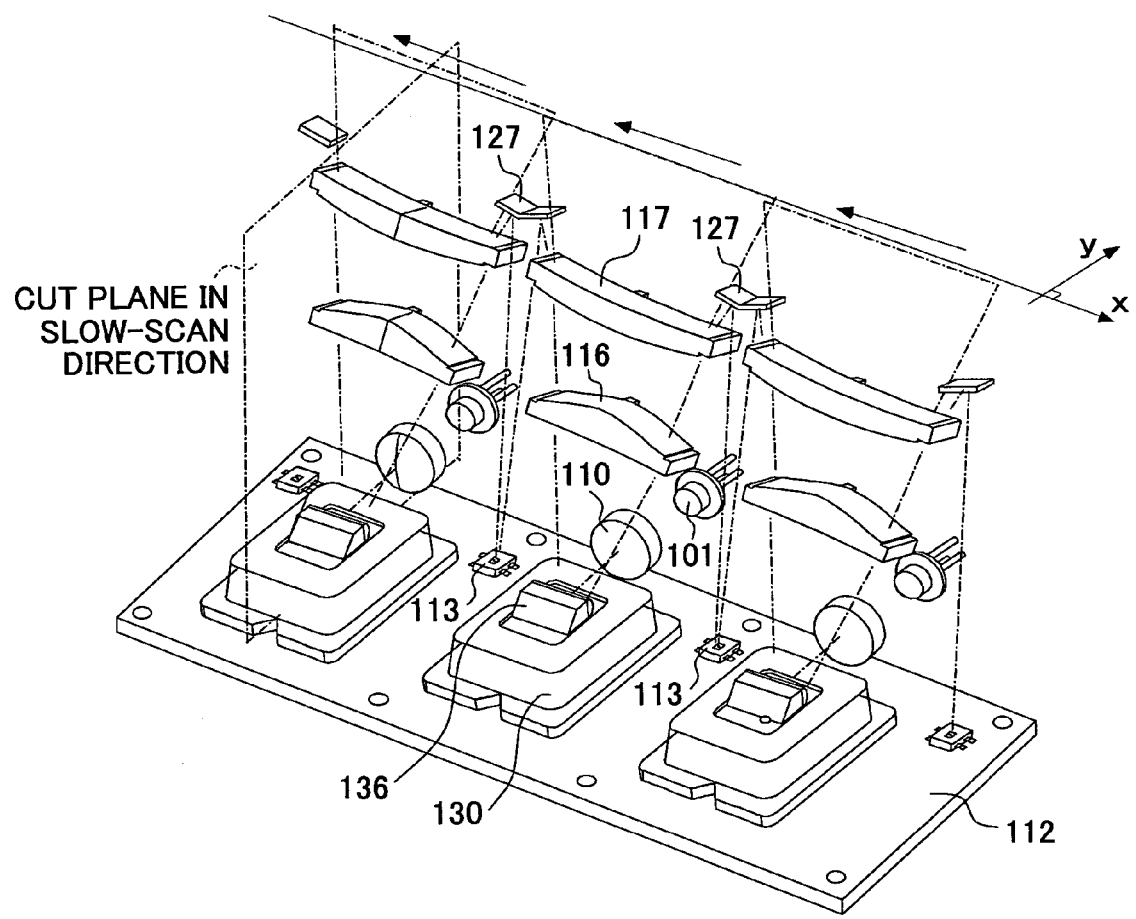
FIG. 3 is a perspective view of the major part of the optical scanning unit shown in FIG. 2, showing the arrangement of optical elements.
Figure 4A:
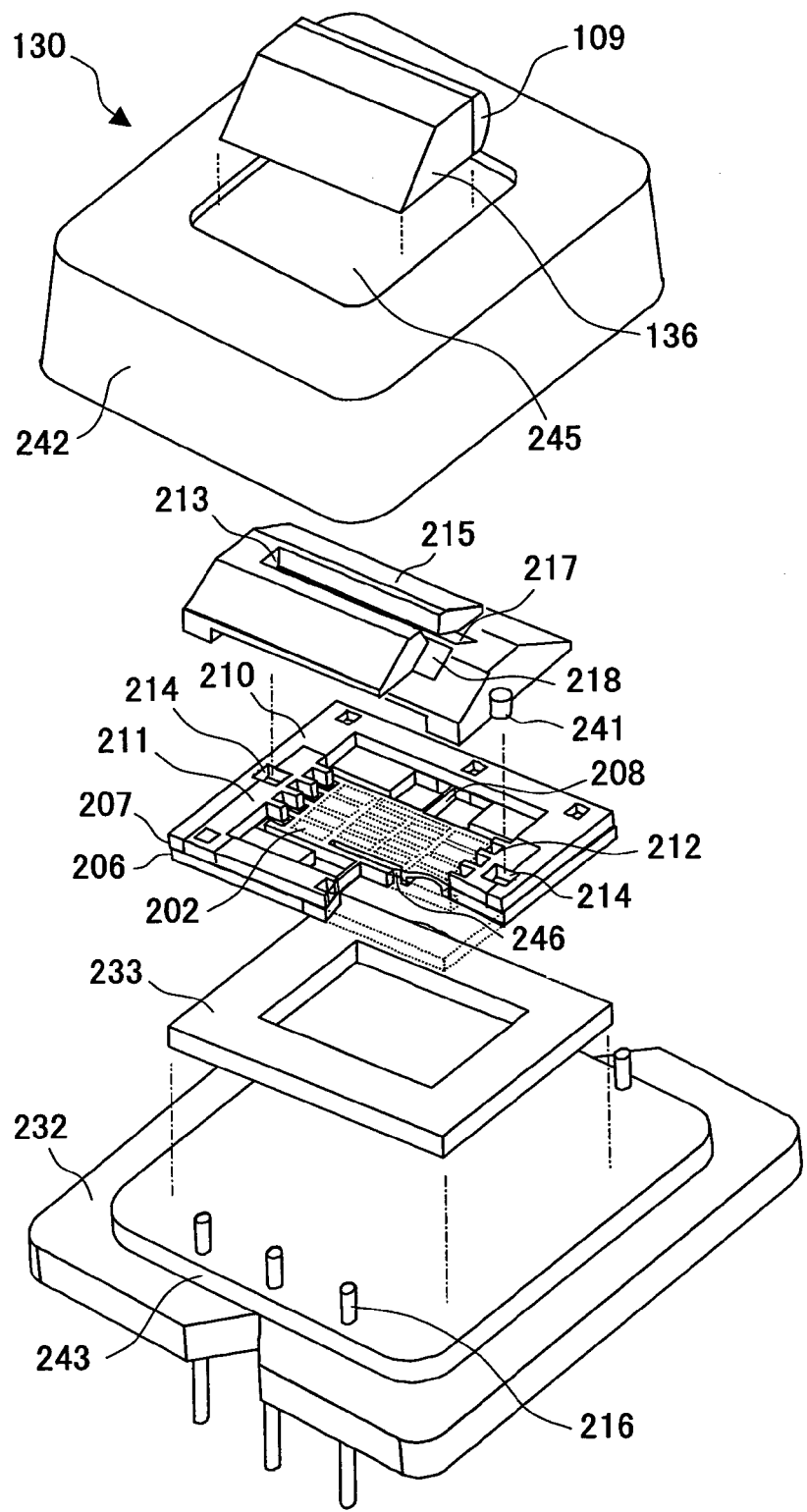
Figure 5:
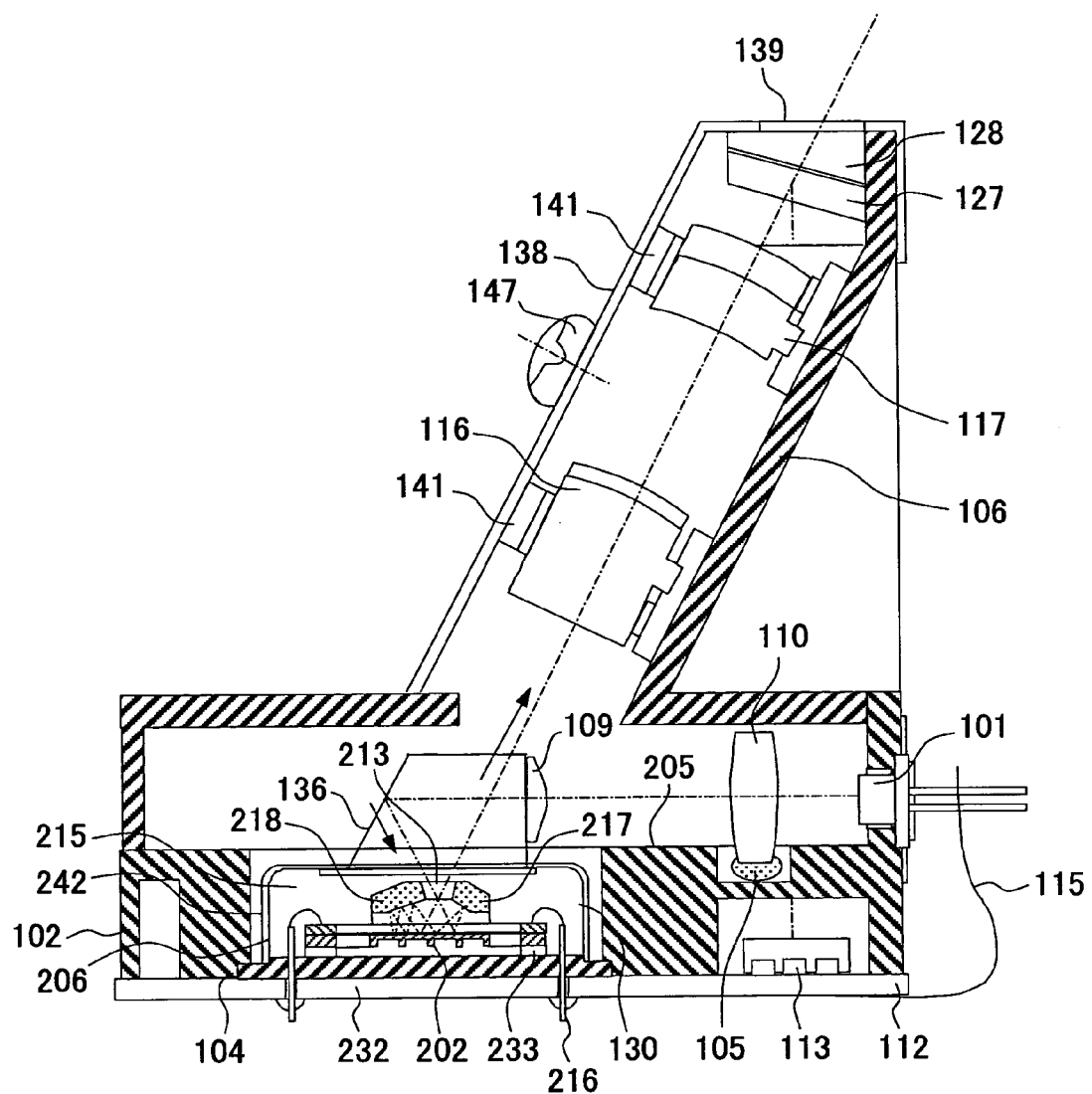
FIG. 5 is a cross-sectional view of the assembled optical scanning unit taken along the slow scan direction.

FIG. 2 is an exploded view of an optical scanning unit according to an embodiment of the invention, and FIG. 3 is a perspective view of the major part of the optical scanning unit of FIG. 2, showing the arrangement of the optical elements. FIG. 4A is an exploded view of the vibrating mirror module 130 shown in FIG. 3, and FIG. 4B illustrates the first substrate 206 and the second substrates 207 forming a vibrating mirror according to an embodiment of the invention. FIG. 5 is a cross-sectional view of the optical scanning unit shown in FIG. 2, taken along the slow scan cut plane.

In the preferred embodiment, three vibrating mirror modules 130 are used in an optical scanning unit, as illustrated in FIG. 2 and FIG. 3. Each of the vibrating mirror modules 130 (or optical scanning means) covers one third of the entire scanning line extending in the fast scan direction. Each vibrating mirror module 130 has a vibrating mirror comprised of a moving mirror 202 and a torsion bar 208 defining the rotational axis of the moving mirror 202, as illustrated in FIG. 4A. The vibrating mirror is formed of a first substrate 206 and a second substrate 207, as illustrate in FIG. 4B.

In this example, the first and second substrates 206 and 207 are silicon substrates, which are bonded together via an insulating layer (such as an oxide film). The first silicon substrate 206 has a thickness of 60 $\mu$m. A moving mirror 202 and a pair of torsion bars 208 extending from the moving mirror 202 in opposite directions are formed in the first substrate 206 by etching so as to be free from the fixed frame 210. The torsion bar 208 has a first portion 208a that defines the rotational axis of the moving mirror 202, and a second portion 208b extending from the first portion 208a and coupled to the moving mirror 202 at two locations (connecting positions) selected so as to satisfy a predetermined condition. Slits 246 formed in the moving mirror 202 define the T-shaped torsion bars 208, both ends of which are connected to the moving mirror 202. The two opposite end portions of the moving mirror 202 are shaped into comb teeth. The edges of the fixed frame 210 that face the comb teeth of the moving mirror 202 are also shaped into comb teeth so as to interleave with the comb teeth of the moving mirror 202 via gap ofs several microns. The moving mirror 202 has a metal film (e.g., an Au film) on the top surface, which is formed by sputtering and functions as a reflecting surface.

The toothed edges of the fixed frame 210 become first and second fixed electrodes 203 and 204, while the toothed edges of the moving mirror 202 define first and second moving electrodes. The first and second moving electrodes are at the same potential during operations. The fixed electrodes 203 and 204 and the moving electrodes may be formed by bonding the first substrate 206 to the second substrate 207 via the insulating layer and by etching the first substrate 206 up to the insulating layer (or the oxide film). In this case, the insulating layer functions as the etch stopper. Islands 221 are also formed in the first substrate 206, to which the first portion 208a of the torsion bar 208 is connected. On both sides of the island 221 are islands 222 and 223, which are isolated from the island 221 by grooves (not shown). The islands 222 and 223 have the fixed electrodes 203 and 204, respectively. The islands 222 and 223 are also separated from the moving mirror 202 by a groove gap of about 5 $\mu$m.

The second silicon substrate 207 has a thickness of 140 $\mu$m, and has an opening in the center penetrating through the substrate 207. The opening is formed by etching so as to define a fixed frame corresponding to the fixed frame 210 of the first substrate 206. The inner edge of the frame of the second substrate 207 has comb-teeth portions, which face each other with openings between them. The tomb-teeth portions function as third and fourth fixed electrodes 211 and 212. The fixed electrodes 211 and 212 are located in islands 224 and 225, respectively, separated from the fixed frame of the second substrate 207 by a groove (not shown). The groove of the second substrate 207 is formed so as not to overlap the groove of the first substrate 206. Accordingly, the first substrate 206 and the second substrate 207 can be bonded together even if several islands are isolated by grooves penetrating the substrates.

The moving electrodes formed in each of the end portions of the moving mirror 202 pass between comb teeth of one of the third and fourth fixed electrodes 211 and 212 during the oscillation of the moving mirror 202.

In this embodiment, a first voltage pulse with a certain phase is applied to the first and second fixed electrodes 203 and 204 of the first substrate 206. A second voltage pulse with a phase earlier than the first voltage pulse is applied to the third fixed electrode 211, and a third voltage pulse with a phase later than the first voltage pulse is applied to the fourth fixed electrode 212, as illustrated in the timing chart shown in FIG. 8.

Figure 6:
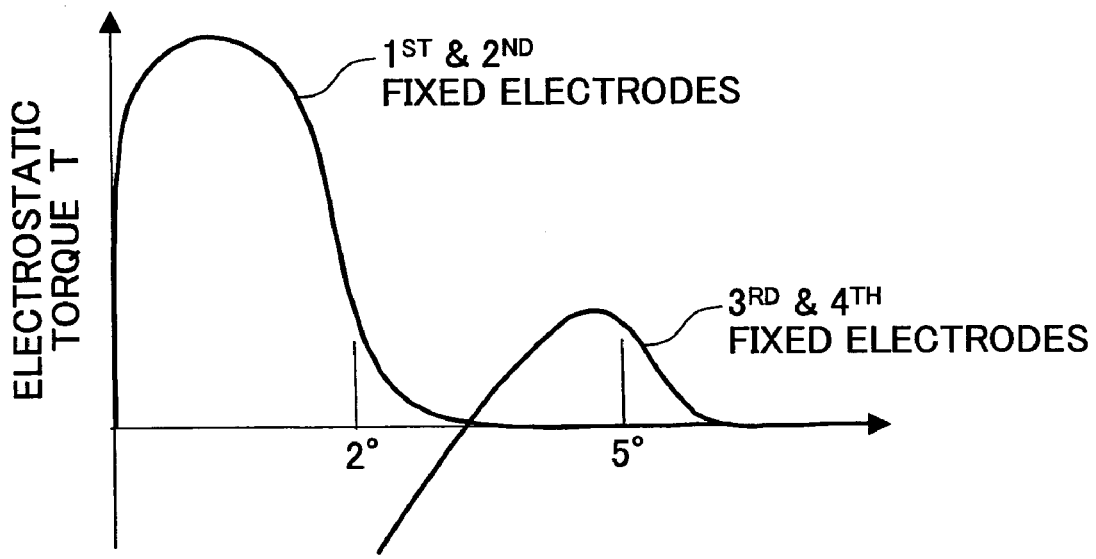
FIG. 6 is a graph showing electrostatic torques generated between electrode pairs as a function of sweep angle.
Figure 7:
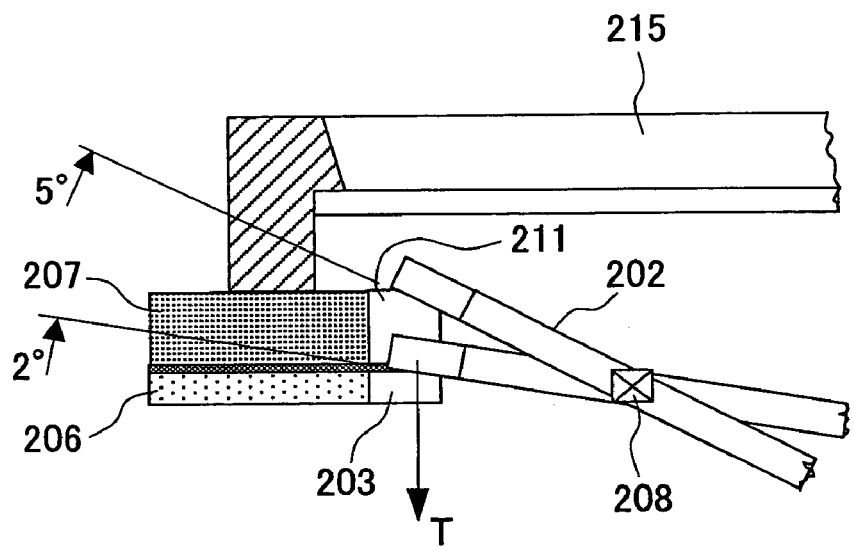
FIG. 7 is a cross-sectional view of a portion of the vibrating mirror module, showing the positional relation between the moving mirror and the electrodes.

FIG. 6 is a graph showing electrostatic torque generated between electrodes as a function of sweep angle of the moving mirror 202. FIG. 7 shows in a cross-sectional view the positional relation between the fixed electrodes and the moving mirror 202, where the counterclockwise torque is in the positive direction.

The moving mirror 202 is horizontal in the initial state. When the second voltage is applied to the third electrode 211, an electrostatic force is generated between the third electrode 211 and the moving electrode of the moving mirror 202 facing the third electrode 211 in the negative direction. This electrostatic force causes the moving mirror 202 to rotate, while giving a twist to the torsion bar 208. The moving mirror 202 swings at such a sweep angle that balances with the return force of the torsion bar 208. When the voltage application is turned off, the moving mirror 202 returns to the horizontal position due to the return force of the torsion bar 208. Before the moving mirror 202 reaches the horizontal position, the first voltage is applied to the first and second fixed electrodes 203 and 204 to generate an electrostatic force in the positive direction, and then the third voltage is applied to the fourth fixed electrode 212 to increase the electrostatic torque in the positive direction. By switching the voltage to be applied to the first through fourth fixed electrodes repeatedly, the moving mirror 202 swings at a sweep angle (about 2 degrees in this embodiment), passing between the comb teeth of each of the first and second fixed electrodes 203 and 204.

By adjusting the force of inertia of the moving mirror 202 and the width and the length of the torsion bar 208 such that the frequency agrees with a desired scanning frequency residing in the band of the primary resonant mode about the torsion bar as the rotational axis, the amplitude of the oscillation is expanded through excitation. As a result, the sweep angle of the moving mirror 202 can be expanded in such a manner that the moving electrodes swing above the third and fourth fixed electrodes 211 and 213. The moving mirror 202 correctly returns to the horizontal position under the electrostatic force generated in the positive direction by the third fixed electrode 211. With this arrangement, the sweep angle on which the electrostatic torque acts is increased, and therefore, a sufficient sweep angle is maintained even if the driving frequency is offset from the resonant frequency.

Figure 8:
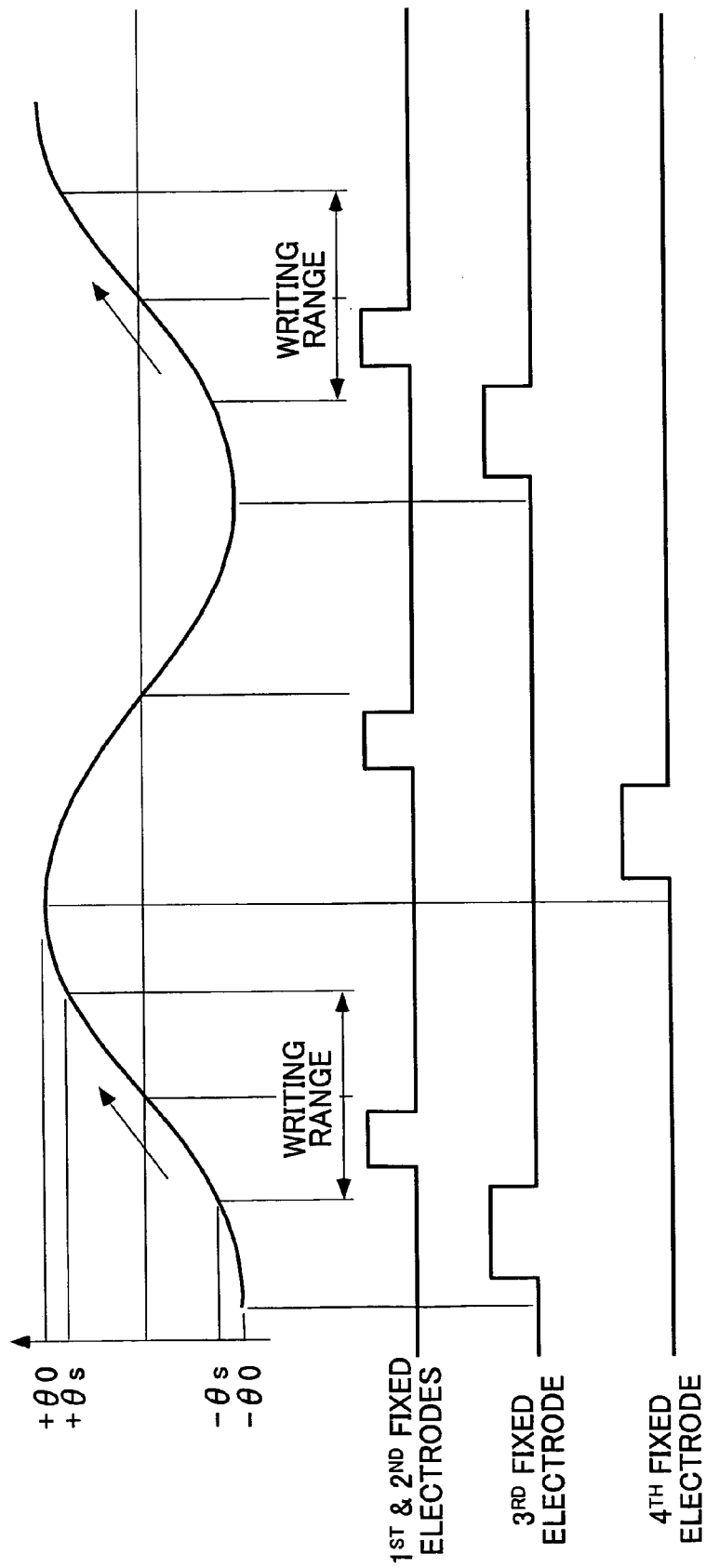
FIG. 8 is a timing chart of pulses applied to the fixed electrodes in a certain range of the oscillation of the vibrating mirror.

FIG. 8 illustrates timing of pulses applied to the respective fixed electrodes in connection with the oscillation. In this embodiment, writing operations are carried out during only one of the back and forth processes of the reciprocating, and voltage pulses are applied at the optimum timing with respect to the oscillation. The phases of the applied pulses are determined with respect to the oscillation so as to generate the electrostatic torque in an efficient manner (that is, so as not to generate a torque opposing the oscillating direction of the moving mirror 202). The following are some conditions in connection with application of voltage pulses.

It is assumed that the thickness of the third and fourth fixed electrodes 211 (that is, the thickness of the second substrate 207) is "t", that the sweep angle of the moving mirror 202 is $\theta$ ($\theta=5°$ in this example), that the width of the mirror 202 is 2L (2L=4 mm in this example), and that the thickness of the first substrate 206 is t0 (t0=60 $\mu$m in this example). Then, the thickness "t" of the second substrate 207 is set so as to satisfy $$t0 < t < L*\sin\theta.$$

If $\theta 0 = \arcsin(t0/L)$, the first pulse is applied to the first and second fixed electrodes 203 and 204 when the sweep angle is in the range of $0 < \alpha 1 < \theta 0$, and the second and third pulses are applied to the third and fourth fixed electrodes 211 and 212, respectively, when the sweep angle is in the range of $-\theta 0 < \alpha 2 < \theta 0$.

Figure 9:
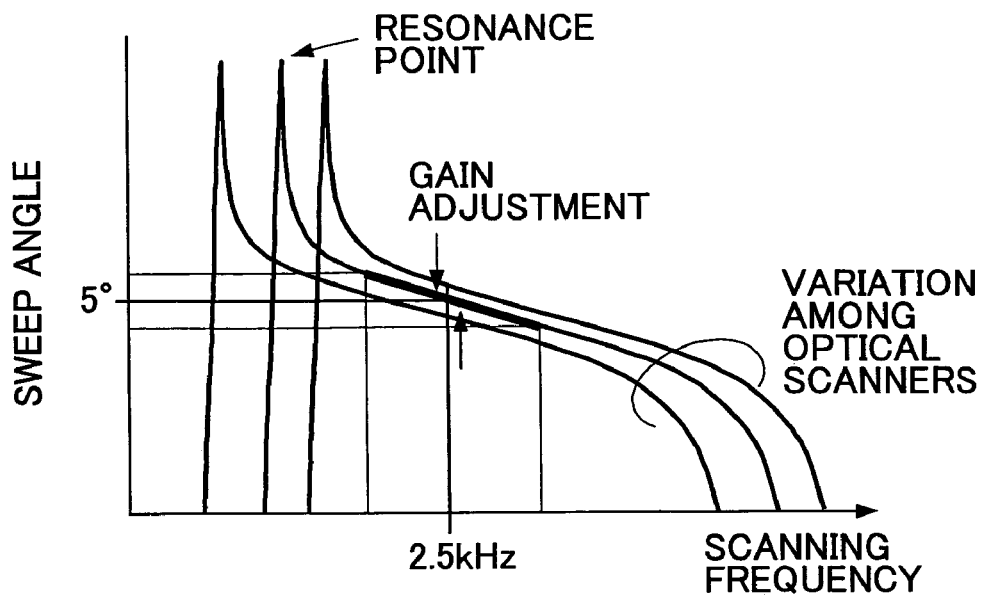
FIG. 9 is a graph of sweep angle characteristic as a function of driving frequency.
Figure 10:
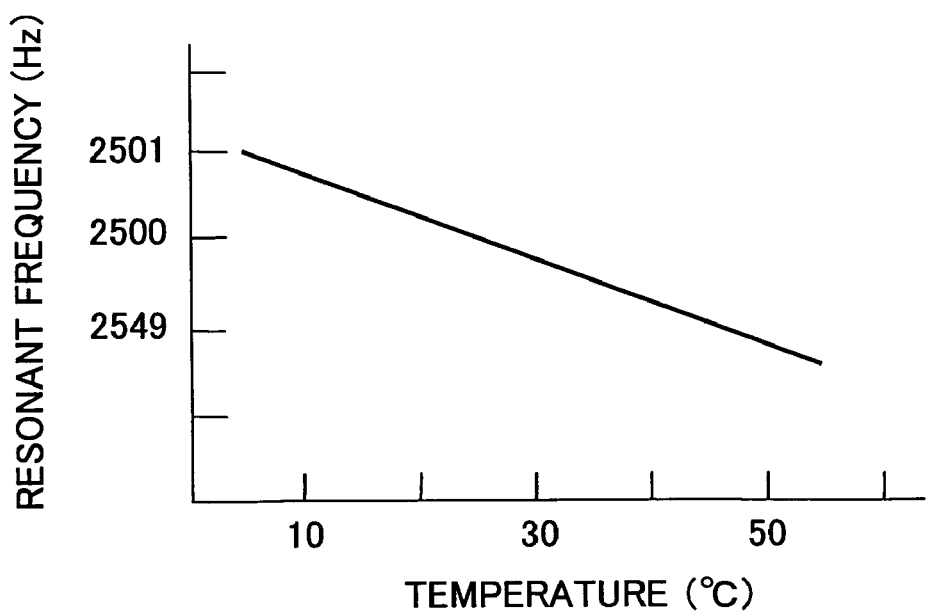
FIG. 10 is graph showing variation in resonance frequency depending on temperature.

FIG. 9 is a graph showing the characteristic of the weep angle with respect to the driving (or the scanning) frequency. When the driving frequency is consistent with the resonant frequency, the sweep angle becomes the maximum; however, it changes steeply near the resonant frequency. This means that even if the driving frequency applied to the fixed electrode is set initially to the resonant frequency by the driving controller for the moving mirror 202, the sweep angle is likely to decrease easily when the resonant frequency varies due to, for example, temperature change. In fact, the resonant frequency is affected by the temperature, as illustrated in FIG. 10. Such instability is disadvantageous. In addition, if multiple vibrating mirror modules are used in the optical scanning unit, as illustrated in FIG. 2 and FIG. 3, the natural resonant frequency varies among the moving mirrors, and the mirrors do not operate at a common driving frequency.

To avoid this disadvantage, the driving frequency is set to a frequency band near the resonant frequency, but slightly higher than the resonant frequency, in which frequency band the change in sweep angle is quite gentle, as illustrated in FIG. 9. In this example, the driving frequency is set to 2.5 kHz when the resonant frequency is 2 kHz, and the sweep angle is set to $\pm 5°$ by adjusting the gain of the applied voltage.

For example, there is variation in resonant frequency due to machining error of moving mirrors (which is about 300 Hz in this embodiment), as well as change in resonant frequency due to temperature change (which is about 3 Hz in this embodiment). Taking such variations into account, it is desirable to set the driving frequency greater than or equal to 2.303 kHz, or smaller than or equal to 1.697 kHz for the resonant frequency of 2 kHz, so as not to conflict with the fluctuating resonant frequency.

If the dimensions of the moving mirror 202 are length 2a, width 2b, and thickness d, and if the torsion bar has a length L and a width c, the moment of inertia I and the spring constant K are expressed using the density P and the material constant G of silicon (Si).

$$I = (4ab\rho d/3) * a^2$$

$$K = (G/2L) * [cd * (c^2 + d^2)/12]$$

The resonant frequency f is expressed as $$f = (1/2\pi) * (K/I)^{1/2}$$
$$= (1/2\pi) * [Gcd * (c^2 + d^2)/24LI]^{1/2}.$$

Since the sweep angle $\theta$ is in proportion to the length L of the torsion bar, the sweep angle is expressed as $$\theta = A/If^2$$

where A denotes a constant. The sweep angle $\theta$ is inversely proportional to the moment of inertia I. In order to raise the resonant frequency f, the moment of inertial has to be decreased; otherwise the sweep angle becomes small.

Figure 13A:
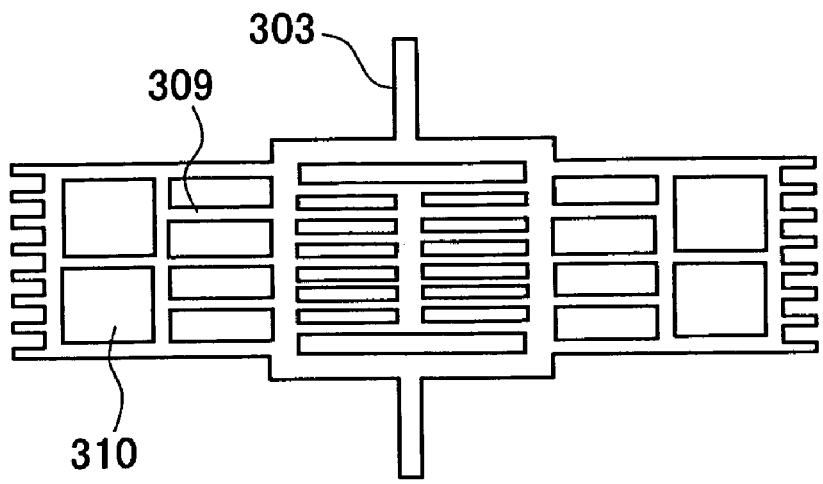
FIG. 13A and FIG. 13B show examples of the moving mirror used in the vibrating mirror module.
Figure 13B:
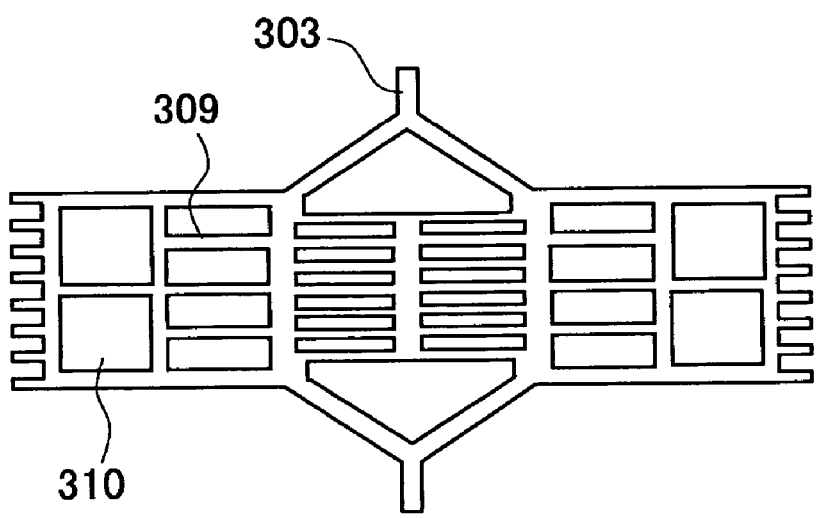

In this embodiment, the moment of inertia I is reduced to about one fifth (⅕) by reducing the thickness d of the moving mirror 202 up to d/10 or thinner by etching the moving mirror from the back face (opposite to the reflecting surface), while leaving ribs of thickness d, as illustrated in FIG. 13A and FIG. 13B.

The variation in parameters defining the moment of inertia I and size error of the torsion bar cause the resonant frequency to vary.

On the other hand, the electrostatic force F between electrodes is expressed as $$F = \epsilon HV^2 / 2 \delta$$

where $\epsilon$ is the permittivity of the air, H is the length of the electrode, V is the applied voltage, and $\delta$ is the distance between the electrodes. The sweep angle $\theta$ is expressed also as $$\theta = B * F/I$$

where B is a constant. The longer the length H of the electrode, the greater the sweep angle is.

Accordingly, by shaping the electrode into comb-teeth, the driving torque can be increased to 2n times as great as an ordinary one, where n is the number of comb teeth.

By increasing the length of the periphery of the electrode as much as possible, high electrostatic torque can be produced at a relatively low voltage.

Meanwhile, the viscosity resistance P of the air is expressed as $$P=C*\eta\upsilon^2*E^3$$

where $\upsilon$ is the velocity of the moving mirror, E is the area of the mirror, $\eta$ is the density of the air, and C is a constant.

The viscosity resistance P affects the rotation of the moving mirror. To prevent the influence of the viscosity resistance, it is desirable to place the moving mirror in a depressurized and sealed housing.

Returning to FIG. 4A and FIG. 4B, the vibrating mirror substrate, which comprises the first substrate 206 and the second substrate 207, is bonded to a ceramic board 233 having an opening in the center. The ceramic board 233 with the vibrating mirror substrate is then mounted on the base 232 of the CAN package such that the reflecting surface of the moving mirror 202 faces up and that the rotational axis of the moving mirror 202 is aligned with the line connecting a pair of V-shaped notches formed in the periphery of the base 232.

Lead terminals 216 penetrate through the base 232. Electrode pads for driving the vibrating mirror are formed in the islands 224 and 225 of the second substrate 207 by removing the insulating layer. Other electrode pads connected to the islands 221, 222, and 223 of the first substrate 206 are also formed by filling the through holes 226, 227, 228 of the second substrate 207 with metal paste via an insulating film. These electrode pads are wire-bonded to the lead terminals 216. A cap 242 is placed over the step 243 of the base 232. The base 232 and the cap 242 are sealed up under a depressurized environment so as to maintain the pressure of the inner space of the cap 242 at or below 1 torr. For the depressurization, non-evaporating getters may be put in the sealed space. In this case, the pressure of the inner space is reduced by activating the getters by externally applying heat after the sealing. The light beam is guided onto and from the vibrating mirror through the transparent window 245 fit in the opening formed on the top face of the cap 242.

A counterpart mirror 215 is arranged above the second substrate 207 so as to face the moving mirror 202. The longitudinal axis of the counterpart mirror 215 is perpendicular to the torsion bar 208. The counterpart mirror 215 is formed of a resin, and has a pair of roof wings extending on both sides of a slit 213. The roof wings are tilted so as to make an angle of 144.7° between them. A metal film is formed by evaporation so as to define reflecting surfaces 217 and 218 over a pair of slopes inclining at 9° and 26.3°, respectively, with respect to the second substrate. The bottom of the counterpart mirror 215 is parallel to the moving mirror 202, and bonded to the top face of the fixed frame of the second substrate 207. The second substrate 207 has positioning holes 214 formed by etching on both sides. Pins 241 projecting from the bottom of the counterpart mirror 215 are inserted in the positioning holes 214 to accurately hold the counterpart mirror 215 so as to be perpendicular to the rotational axis of the moving mirror 202.

Figure 11B:
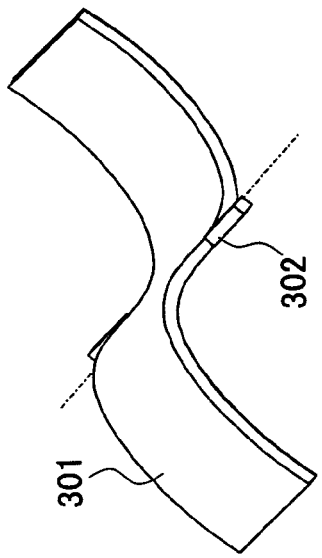
FIG. 11A and FIG. 11B illustrate deformation of a conventional vibrating mirror occurring during the oscillation.
Figure 11A:
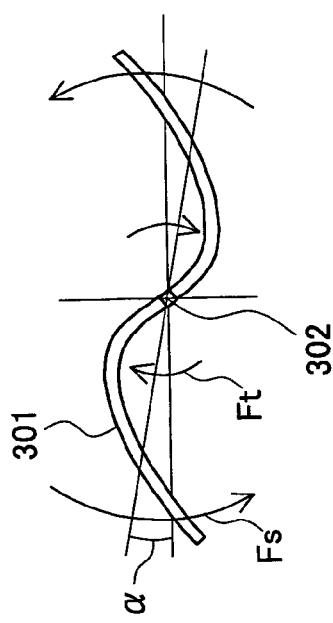

FIG. 11A and FIG. 11B illustrate a conventional type of vibrating mirror, which has a moving mirror 301 and a torsion bar 302 extending directly from the moving mirror 301 along the rotational axis of the mirror. The force of inertia Fs of the moving mirror 301 acts depending on the distance from the rotational axis, while the rotational driving force Ft is applied to the rotational axis (that is, on the torsion bar 302). As the width of the moving mirror (perpendicular to the rotational axis) becomes larger, the center of the total force of inertial Fs integrated over the distance from the rotational axis shifts toward the end of the mirror. Consequently, the moving mirror undulates like a sinusoidal wave due to the shearing stress generated in the moving mirror, as illustrated in FIG. 11A. If the sweep angle α is 5 degrees, and if the thickness of the moving mirror is 60 μm, displacement becomes the maximum at a position offset by A/6 from the rotational axis, where A is the width of the mirror. Such displacement reaches as much as 0.5 μm perpendicular to the plane of the moving mirror 202, and the surface accuracy is degraded.

Figure 12B:
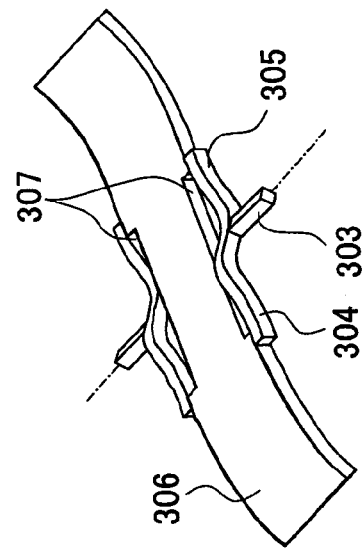
FIG. 12A and FIG. 12B illustrate deformation of the vibrating mirror of the invention occurring during the oscillation.
Figure 12A:
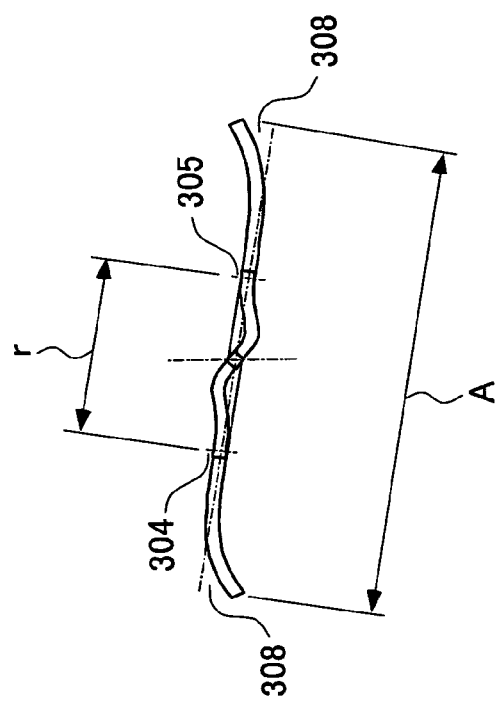

FIG. 12A and FIG. 12B illustrate a vibrating mirror according to an embodiment of the present invention. In this example, a T-shaped torsion bar 303 is used. The torsion bar 303 has a first portion defining the rotational axis of the moving mirror 306 and a second portion (or arms) extending from the first portion so as to be perpendicular to the rotational axis. The ends of the arms (or the second portion) of the torsion bar 303 are coupled to the moving mirror 306, while a slit 307 separates the arms from the moving mirror 306. The width of the torsion bar 303 is the same throughout the first and second portions in this example.

Although the arms of the torsion bar 303 deform due to the shearing stress, the major portion of the moving mirror 306 can be maintained flat because the deformation forces concentrate on the arms of the torsion bar 303. Since the arms of the torsion bar 303 are coupled to the moving mirror 306 near the center of the total inertia force Fs, deformation can also be reduced in the end portions 308 outside the coupled positions. In this example, the arms of the torsion bar 303 are coupled to the moving mirror 306 at the maximum displacement positions such that the distance "r" between the coupled positions 304 and 305 is one third of A (A/3). However, the same effect can be achieved if r is greater than one sixth of A (r>A/6), in other words, as long as the coupled position is separated from the rotational axis by distance A/12 (corresponding to the inflection point) or more.

FIG. 13A and FIG. 13B illustrate examples of the vibrating mirror, showing the rear face opposite to the reflecting surface of the moving mirror. In FIG. 13A, the torsion bar 303 is T-shaped, as in the example shown in FIG. 12B. In FIG. 13B, the torsion bar 303 is Y-shaped. Regardless of the shape of the torsion bar, deformation of the moving mirror can be substantially prevented and flatness can be maintained by coupling the torsion bar to the moving mirror at two or more locations offset from the rotational axis and arranged symmetrical with respect to the rotational axis.

The inertial force Fs acting on the moving mirror depends on the distance from the rotational axis. Accordingly, the inertial force Fs around the end portion of the moving mirror can be reduced by reducing the mass of the moving mirror according to the distance from the rotational axis. In the examples shown in FIG. 13A and FIG. 13B, the mass of the moving mirror is decreased in three increments toward the end of the moving mirror by decreasing the number of ribs 309 extending perpendicular to the rotational axis in three steps, and by increasing the size of the hollow areas 310 defined by the ribs 309.

The rib pattern is not limited to the examples shown in FIG. 13A and FIG. 13B, and the ribs 309 may extend oblique to the rotational axis. In addition, the size of the hollow areas 310 defined by the ribs 309 may be the same, while changing the depth of the hollow area 310.

FIG. 14A and FIG. 14B show other examples of the vibrating mirror, in which a mirror substrate having a reflecting surface is bonded to the substrate 206 having torsion bars. In general, a silicon substrate easily warps due to processing distortion generated during polishing of the wafer surface or film formation imparting internal stress. Accordingly, an SOI substrate, in which two silicon substrates are bonded via an oxide film and the surface is polished in the bonded state, is used. If a moving mirror is formed by releasing the bonded state of one of the substrates, the stress balance between the two substrates is disrupted, and the surface accuracy is degraded to several mR. To avoid this, in the example shown in FIG. 14A, the mirror substrate 321 is formed by the second substrate 207, and the bonded state between the first substrate 206 and the second substrate 207 is maintained to keep the stress balance between these substrates.

The first substrate 206 is etched up to the insulating layer 322 so as to leave the moving electrodes 328 of the moving mirror, ribs 323, the T-shaped torsion bars 324, and the fixed frame 325 having the first and second fixed electrodes. The second substrate 207 is etched up to the insulating layer 322 so as to leave the mirror substrate 321 and the fixed frame 326 having the third and fourth fixed electrodes. The exposed insulating layer 322 is dissolved. In this manner, a moving mirror, which is structured with a framework and the mirror substrate 321 bonded to the framework, is fabricated. The framework has torsion bars 324, moving electrodes 328, and hollow areas 327. The thickness of the mirror substrate 321 is the same as that of the third and fourth fixed electrodes. The mirror substrate 321 is insulated from the moving electrode 328.

FIG. 14B shows another example of the vibrating mirror fabricated using an SOI substrate. In this example, a mirror substrate 329 is fabricated separately, and then bonded to the SOI substrate. The first substrate 206 is etched up to the insulating layer 322 so as to leave the moving mirror 331, the T-shaped torsion bars 332, and the fixed frame 333 with the first and second fixed electrodes. This process is referred to as the first etching. Then, the first substrate 206 is again etched to the middle to form recesses 335, while leaving ribs 334. This process is referred to as the second etching. On the other hand, the second substrate 207 is etched up to the insulating layer 322 so as to leave the fixed frame 336 having the third and fourth fixed electrodes. The exposed insulating layer is dissolved. Up to this step, the process is the same as that shown in FIG. 14A. In the example shown in FIG. 14A, a reflecting layer is provided to the bonded surface of the first substrate 206. However, in the example of FIG. 14B, the mirror substrate 329 is bonded to the bottom of the first substrate 206 so as to cover the recesses 335. Thus, a hollow moving mirror is fabricated. The mirror substrate 329 is formed from a different wafer, and bonded using an oxide film or fluoride film with a tensile stress. By bonding two silicon substrates so as to produce tension at the bonded surface, the flatness of the mirror in the stationary state is improved, and simultaneously, the flexural rigidity against the shearing stress during operations is improved.

Next, the optical scanning unit using the above-described vibrating mirror module 130 is explained with reference to FIG. 5.

FIG. 5 is a cross-sectional view of the optical scanning unit taken along a slow-scan cut plane. The light beam emitted from a semiconductor layer 101 is incident on the vibrating mirror module 130 via a coupling lens 110 and an incident prism 136. The light beam passes through the slit 213 (see FIG. 4A also) and is incident on the moving mirror 202 at an angle of about 20 degrees inclining in the slow scan direction with respect to the normal line, within the slow-scan cut plane containing the torsion bar. The light beam reflected from the moving mirror 202 is further reflected from the first reflecting surface 217 back to the moving mirror 202. The light beam is again reflected from the moving mirror 202 and then strikes the second reflecting surface 218. The light beam is reflected back and forth between the second reflecting surface 218 and the moving mirror 202, while shifting the reflecting position in the slow-scan direction. After the light beam is reflected five times from the moving mirror 202, the light beam passes through the slit 213 and exits the vibrating mirror module 130.

Several times of reflection at the moving mirror 202 guarantees a sufficient scanning angle, while reducing the optical path length, even if the sweep angle of the moving mirror is small.

If the number of reflections at the moving mirror 202 is N, and if the sweep angle is $\alpha$, the scanning angle $\theta$ is expressed as $\theta=2N\alpha$. In this example, N=5 and $\alpha=5°$, and therefore, the maximum scanning angle becomes 50°, of which 35° is assigned to the image recording range. Oscillation making use of resonance requires only a small level of applied voltage with less heat generation. However, as the recording rate (that is, the resonant frequency) increases, the spring constant K of the torsion bar has to be increased, which makes the sweep angle narrower. To avoid such inconvenience, the counterpart mirror 215 is provided in the vibrating mirror module 130 to expand the scanning angle through reflection. This arrangement can guarantee a sufficient scanning angle regardless of the recording speed.

Since roof-like reflecting surfaces 217 and 218 are provided to the counterpart mirror 215, the incident angle of the beam on the moving mirror 202 in the slow-scan direction is switched between the positive and negative directions (such that the reflected beam heads to the right and to the left alternately) at every reflection. This arrangement can prevent the scanning line from bending on the scanned plane due to the oblique incidence, and maintain the scanning line straight. In addition, since the rotation of the light flux having occurred within a plane perpendicular to the optical axis returns to the original state, imaging performance can be maintained high.

Figure 15:
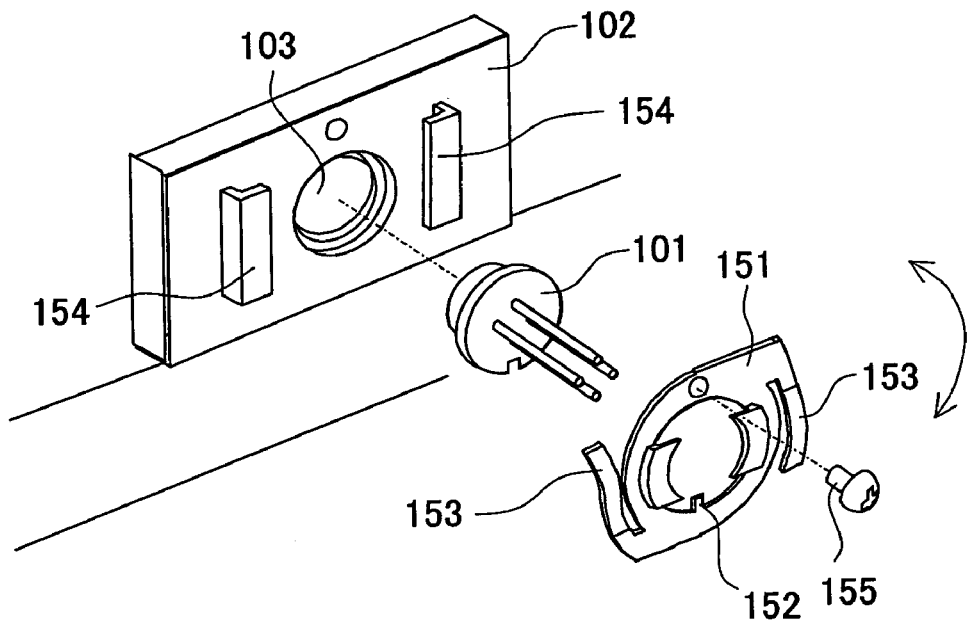
FIG. 15 is an exploded view of the light source part used in the optical scanning unit according to an embodiment of the invention.

The semiconductor layer 101 used as the light source of the optical scanning unit is illustrated in FIG. 15. In the semiconductor laser 101, two light-emitting sources are formed monolithically at a pitch of 50 µm in the slow-scan direction. The semiconductor laser 101 is fit into a stepped through-hole 103, which is formed in the standing wall of the frame member 102, from the back face of the wall, based on the periphery of the stem of the semiconductor laser 101 as the reference. The optical axis is positioned by pushing the flange of the semiconductor laser 101 against the step in the through-hole 103. Then the semiconductor laser 101 is pressed and fixed from the rear side by the retainer plate 151.

When fixing the semiconductor laser 101, the projection 152 of the retainer plate 151 is fit into the cutaway in the periphery of the stem, and the stem is rotated about the center axis of the through-hole 103 so as to bring a pair of leaf springs 153 to be engaged with the hooks 154 formed on the frame 102. The semiconductor laser 101 pushed into the through-hole 103 is adjusted such that the aligning line of the light-emitting sources inclines a predetermined amount from the fast scan direction. Then, the semiconductor laser 101 is fixed by a screw 155 to prevent rotation.

Referring back to FIG. 2 and FIG. 3, a coupling lens 110 is fit into the U-shaped recess 105 using ultra-violet (UV) setting adhesive, and the light-emitting point is correctly positioned along the optical axis such that the optical axis of the coupling lens 110 aligns with the exit axis of the semiconductor laser 101, and that the outgoing beam becomes parallel flux. After the positioning, the UV adhesive placed between the recess and the coupling lens 110 is hardened.

The positioning of the coupling lens 110 may be carried out after the vibrating mirror modules 130 and the cylinder lens 109 (shown in FIG. 4A) are assembled. In this case, variation in the surface accuracy of the moving mirror and offset of the focusing point of the cylinder lens can be cancelled by adjusting the coupling lens 110. In other words, the accuracy requirement can be eased. In the example shown in FIG. 2 and FIG. 3, three light sources with the same structures are used.

The two parallel light fluxes having passed through the coupling lens 110 strike the incident prism 136 attached to the window of the vibrating mirror module 130, via the cylinder lens 109 which is bonded to the incident plane of the prism 136 and has a positive curvature in the slow-scan direction. The light fluxes are reflected downward by the slope of the prism 136 and guided into the vibrating mirror module 130 as the focusing flux converging on the moving mirror surface.

Figure 16:
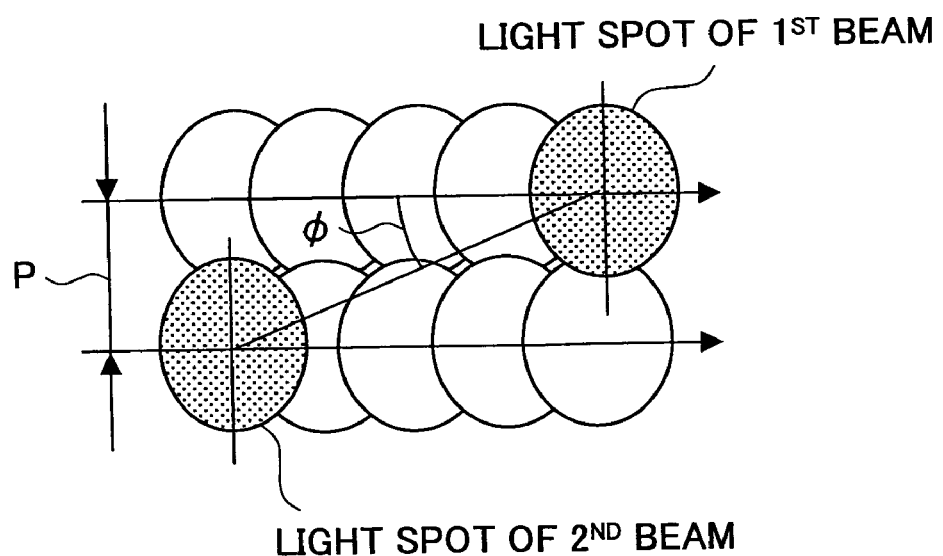
FIG. 16 shows an example of positional arrangement of beam spots on the scanned plane.

FIG. 16 shows beam spots formed on the scanned plane. The space P between the beam spots of the first and second beams is determined by assembling the semiconductor laser 101 while adjusting the inclination of the semiconductor laser 101. The space P is expressed as $$P=\beta*p*\sin\phi$$

where β is the slow-scan magnification of the entire system from the light source to the scanned plane, including the first and second scan lens 116 and 117 (shown in FIG. 3), and p is the pitch p of the two light-emitting sources of the semiconductor laser. The space P between beam spots is adjusted according to the amount of correction for line inclination formed on the transfer belt, which will be described later.

Again, returning to FIG. 2, the vibrating mirror module 130 is fit into the stepped square hole 104 formed in the frame member 102 from the bottom, and positioned with reference to the outer edge of the base 232 (FIG. 4A) with the flange pushed against the step of the square hole 104. In this example, three vibrating mirror modules 130 are positioned in the frame 102 at even intervals. Each of the vibrating mirror modules 130 is attached to the print board 112 by inserting the lead terminals projecting from the bottom of the base 232 (FIG. 4A) into the holes of the print board 112 and soldered. The top face of the print board 112 is pushed against and fixed to the frame member 102 so as to block the bottom opening of the frame member 102, thereby accomplishing circuit connection. On the print board 112 are mounted electronic components forming laser driving circuits and moving mirror driving circuits, as well as sync detection sensor 113. Wiring to the external circuit is implemented collectively. The cable 115, one end of which is coupled to the print board 112, is connected to the lead terminal of the semiconductor laser 101.

The top face of the frame member 102 is parallel to the step formed in the rear side of the square hole 104, against which the flange of the vibrating mirror module 130 is abutted in the normal line direction of the mirror. Two projections extending from the bottom of the housing 106 are fit into the corresponding holes of the frame member 102, and positioned within the plane. Then, the housing 106 is attached by screws at four corners. In this example, the housing 106 is screwed to the print board 112 via the through-holes of the frame member 102, and the housing 106 and the print board 112 are put together with the frame member 102 inserted between them. Finally, soldering is carried out.

A first scanning lens 116 and a second scanning lens 117 are arranged on the housing 106 in the fast scan direction. The first scanning lens 116 and the second scanning lens 117 are positioned such that the respective scanning ranges slightly overlap each other. The first scanning lens 116 has a projection 120 projecting at the center of the slow-scan reference face and used for positioning in the fast scan direction, as flat faces 119 provided on both ends for positioning in the optical axis direction. The projection 120 and the flat faces 119 are provided on both the incident side and the exit side of the first scanning lens 116. The projection 120 is fit into the groove 122 monolithically formed in the housing 106. The flat faces 119 are inserted in a pair of grooves 121. The first scanning lens 116 is pressed by the leaf springs 143 toward the incident side, and maintained in this plane. In this manner, relative positions of the first scanning lenses 116 are aligned within a plane perpendicular to the optical axis where the positioning is carried out. By pushing the slow-scan reference faces of the first scanning lens 116 against a pair of projections 142 projecting from the housing 106, the height in the slow-scan direction is determined within the plane perpendicular to the optical axis. The first scanning lens 116 is finally supported by the leaf springs 141 integrally formed in the cover 138.

The second scanning lens 117 has a projection 123 projecting at the center of the slow-scan reference face and used for positioning in the fast scan direction, as flat faces 144 provided on both ends for positioning in the optical axis direction. The projection 123 is fit into in the groove 122 monolithically formed in the housing 106. The flat faces 144 are inserted in a pair of grooves 121. The second scanning lens 117 is pressed by the leaf springs 143 toward the exit side, and maintained in this plane. The slow-scan reference face of the second scanning lens 117 is pressed against a pair of projections 145 and 146 projecting from the housing 106 in order to determine the height in the slow-scan direction. The second scanning lens 117 is finally supported by the leaf springs 141 integrally formed in the cover 138.

A total of four sync detection sensors 113 are provided to the print board 112 in the example shown in FIG. 2 and FIG. 3. Two of them are located at corresponding ends of the print board 112 and the other two are placed between two adjacent vibrating mirror modules 130. Each of the latter sensors 113 is used in common for the corresponding adjacent modules 130. With this arrangement, the beam is detected at the beginning point and the end point of each vibrating mirror module 130. On the exit side of the second scanning lenses 117, V-shaped mirror seats 128 are formed in the housing 106 between scanning ranges of two adjacent scanning lenses 117. A high-brilliance aluminum thin film is bonded to each of the mirror seats 128 to reflect the light beam to the associated sync detection sensor 113 via the opening 129 formed between scanning ranges and the square holes formed in the frame member 102. The reflecting face of one wing of the V-shaped mirror seat 128 faces the scan beginning position of one second scanning lens 117, and the reflecting face of the other wing of the V-shaped mirror seat 128 faces the scan end position of the adjacent second scanning lens 117. The cover 138 has openings 139 through which the light beams pass. The cover 138 is screwed to the housing 106 tightly so as to press the first and second scanning lenses 116 and 117 by leaf springs 141.

Figure 17:
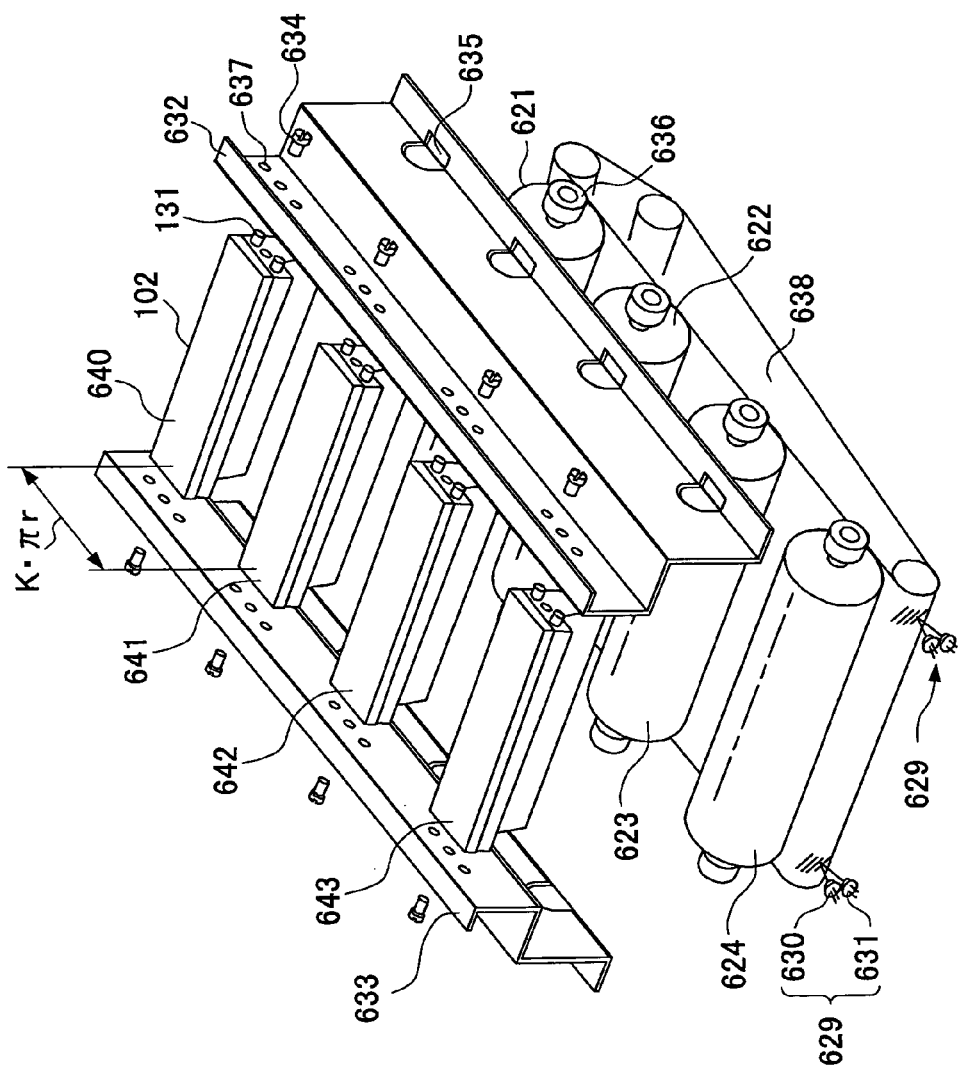
FIG. 17 is an exploded perspective view of a major part of a tandem type color image reproducing apparatus, to which the optical scanning unit of the present invention is applied, showing the positioning of the optical scanning units with respect to the photosensitive drums.

FIG. 17 is an exploded perspective view of a tandem-type color image reproducing/forming apparatus, to which the above-described optical scanning unit is applied, showing the positioning of the optical scanning units 640–643 with respect to the associated photosensitive drums 621–624. The frame member 102 and the housing 106 of the optical scanning unit illustrated in FIG. 2 through FIG. 5 are made of glass-fiber reinforced resin or dye cast aluminum so as to guarantee rigidity to a certain extent. A pair of positioning pins 131 and a pair of screw holes 133 are formed on both sides of the housing 106, as illustrated in FIG. 2. The image reproducing/forming apparatus shown in FIG. 17 has a pair of steel plates 632 and 633 facing each other in the fast scan direction. Each of the steel plates 632 and 633 has cutaways 635 for receiving and positioning the bearings 636 of the photosensitive drums 621, 622, 623, and 624, thereby supporting these photosensitive drums at correct positions with respect to each other. In this embodiment, the distance between the drum axes is set equal so as to an integral multiple of the circumference of the photosensitive drum. If the diameter of the drum is r, the distance between two adjacent drums is set to k*πr. The positioning pins 131 of each of the optical scanning units 640–643 are fit into the holes 637 of the steel plates 632 and 633 such that the end faces of the housing come into contact with the inner face of the steel plates 632 and 633. The optical scanning units 640–643 extending between the steel plates 632 and 633 are fixed to the steel plates 632 and 633 using screws 634.

Figure 18:
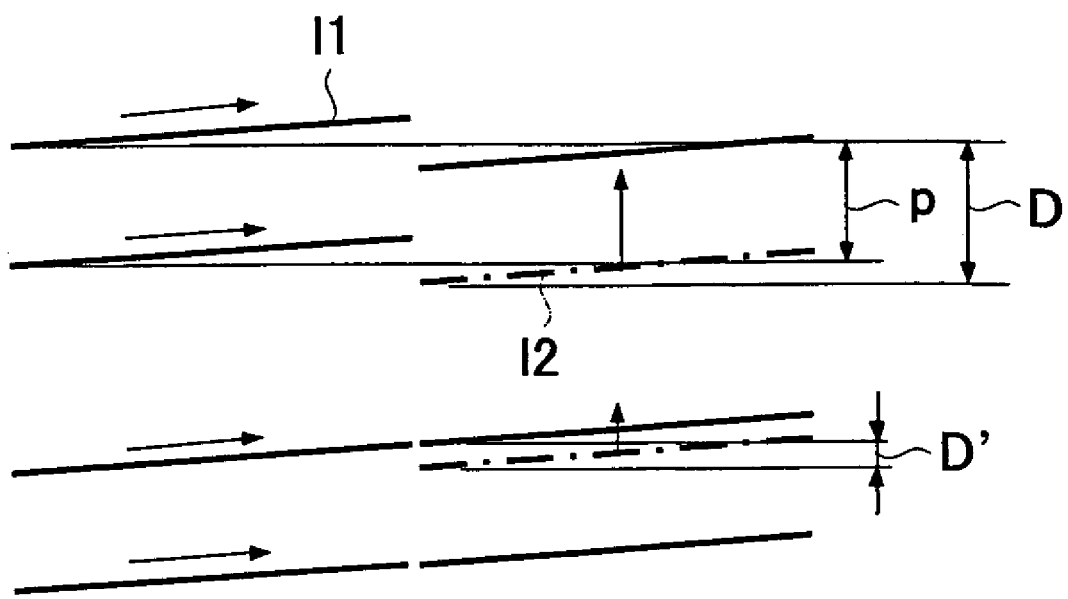
FIG. 18 illustrates how the seams of line images are corrected between two adjacent optical scanning units.

FIG. 18 illustrates how the seams of the line images formed by adjacent vibrating mirror modules 130 are corrected. In this embodiment, line adjustment is carried out such that the writing start positions of the respective lines are aligned in the slow scan direction. If the recording positions of two adjacent vibrating mirror modules 130 are offset from each other by distance D, as illustrated by two lines l1 and l2, such offset has to be corrected so that D becomes zero (D=0). In the first step of the correction, the writing start timing of the scanning line is corrected by a line pitch p or its integral multiple. To be more precise, by selecting the sync detection signal for reading the pixel data, the timing is shifted every k times of a period T (kT), where k is a natural number selected such that L-k*p becomes closest to zero. L denotes the scanning width. Then, in the second step of the correction, the remaining offset is corrected by shifting the oscillation phase of the vibrating mirror every T/n (one n-th of the period T). Thus, the remaining offset is corrected by an integral multiple of p/n, where n is a natural number selected such that L-(k+1/n)*p becomes closest to zero.

In this manner, the line images recorded in adjacent areas on the transfer belt 638 (FIG. 17) can be correctly joined.

Figure 19:
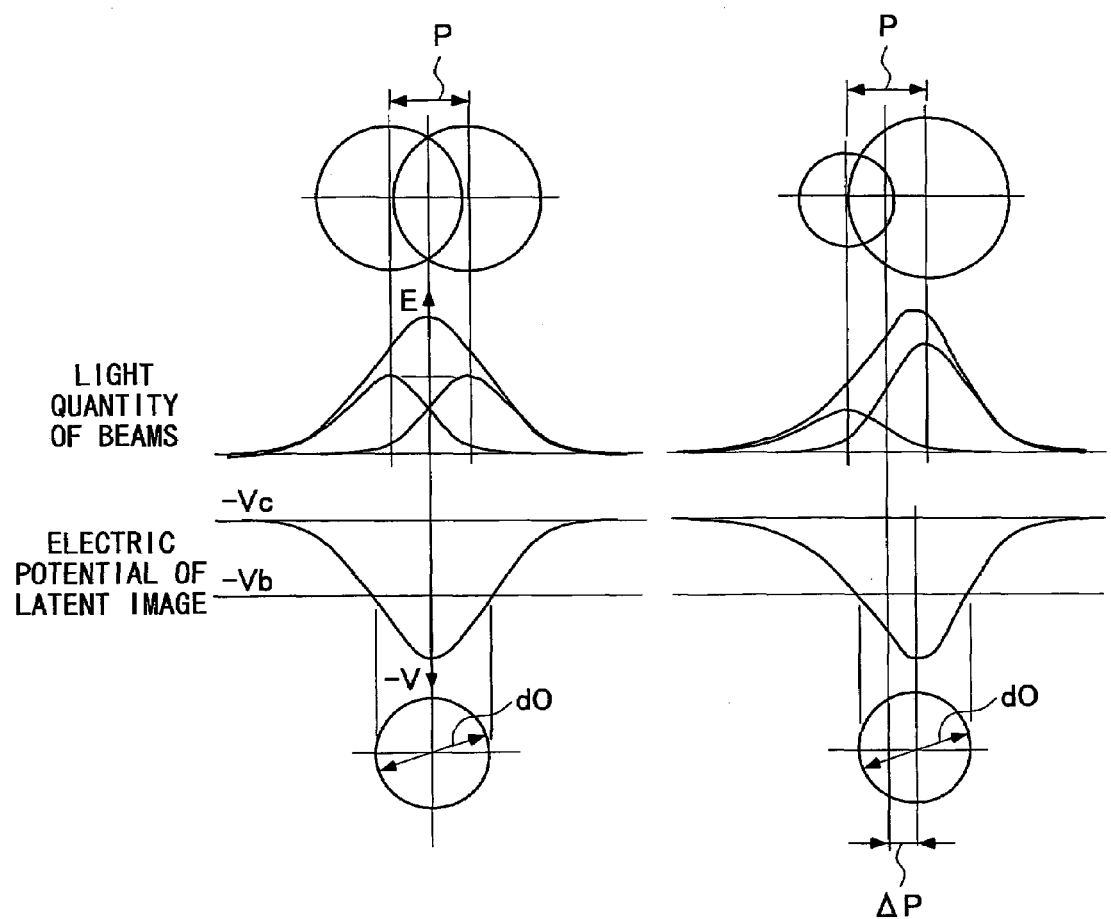
FIG. 19 illustrates the intensity distributions of beam spots in the slow scan direction and electric potential distribution of the electrostatic latent image formed by the beam spots.

FIG. 19 shows the intensity distribution of each of the beam spots in the slow scan direction, together with the electric potential distribution of the electrostatic latent image formed by such beam spots. In FIG. 19, the left to right direction is the slow scan direction, and the beam spots and the associated profile correspond to a dot image of one pixel. The left-hand side electric potential distribution is produced by the beam emitted from the first light-emitting source, and the right-hand side electric potential distribution is produced by the beam emitted from the second light-emitting source.

When the beam spots are very close to (or overlap) each other, the light quantity profile is a composite profile reproduced as a uniform distribution. If the light quantities of the beam spots are the same (as in the left figure), the middle of the beam spots becomes the center of the distribution. If the light quantity of the beam spots differ from each other (as in the right figure), two distributions of two latent images with different diameters are synthesized. In this case, the center of the distribution is offset from the middle toward the larger light quantity.

Electrically charged toner particles are attracted and adhere to a center portion of the electric potential distribution, in which portion the electric potential is higher than the developing bias potential, to form a dot. By balancing the light quantities of the beam spots, the dot diameter can be set to a uniform diameter d0 regardless of where the center of distribution is located.

Accordingly, by changing the ratio of the light quantities of the beam spots and by shifting the center of the latent image across the line, a line having the same width as that formed by a single beam tilted by pitch P off the scanning direction can be produced. Therefore, even if the scanning line is tilted, such line tilt can be corrected without using a mechanical structure.

Figure 20:
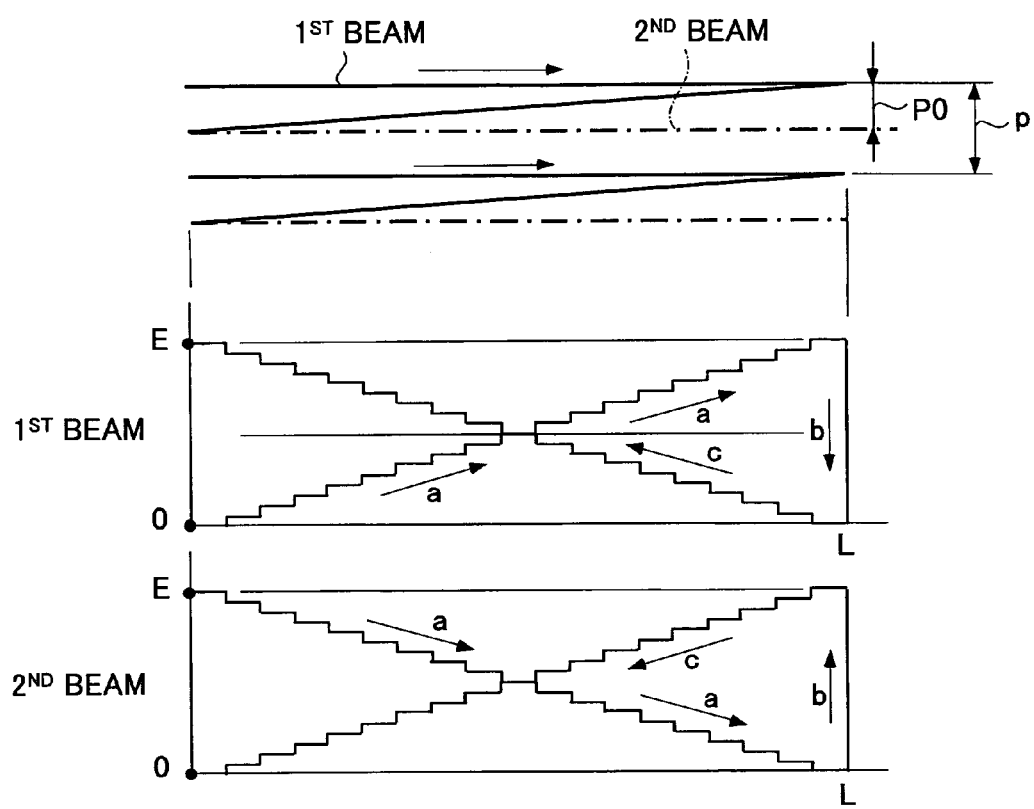
FIG. 20 illustrates how the slope of the recorded line is corrected so as to slant to the right with respect to the scanning line.

FIG. 20 shows an example of correcting the recorded line so as to slant to the right with respect to the scanning line. The tilt correction amount Δθ for the line can be detected as a deviation relative to the reference color, based on the detected pattern (the toner image) formed on the transfer belt 538 by the optical scanning units of the respective colors. To detect the tilt correction amount, registration mark offset detection means 629 are positioned on both sides of he transfer belt 638, as illustrated in FIG. 17. The registration mark offset detection means 629 comprises a light-emitting diode 630 and a PIN photodiode 631 that receives a beam emitted from the diode 630 and reflected from the image on the transfer belt 638.

Based on the detection result, the beam pitch P of the first and second beams is set in response to the line tilt correction amount Δθ, so as to satisfy $$P = L * \tan\Delta\theta$$

using the scanning width L. Then, the light quantities of the beams are controlled such that the light quantity of the second beam becomes the maximum, while the light quantity of the first beam becomes zero at the scan start position, and that the light quantity of the first beam becomes the maximum, while the light quantity of the second beam becomes zero at the scan end position, as illustrated in FIG. 20. In addition, the light quantities of the beams are adjusted such that the light quantity of the first beam increases linearly, while the light quantity of the second beam decreases linearly, and that the sum of the light quantities of the first and second beams is constant at any position in the scanning direction. In this manner, the track (or the path) of the center of the latent image becomes a upward slope, as indicated by the bold line in FIG. 20, with respect to the scanning direction. The same correction is carried out in the adjacent scan area. Consequently, the line images formed by the respective optical scanning means (including the vibrating mirror modules) are aligned in parallel, and joined together sideways to form an oblique line on the transfer belt.

By the way, the light quantity is expressed as a product of the beam intensity and the laser-ON time. When regulating the light quantity as described above during the formation of the latent image, either
(a) the beam intensity is changed, or
(b) the pulse width of the beam is changed.

Although the details are described later in connection with driving control for the semiconductor laser, the light quantity is changed through stepwise approximation.

The registration mark offset detection means 629 can detect not only tilting offset among colors, but also a parallel shift component (registration offset) simultaneously. Such parallel shift or registration offset can be corrected by applying the above-described line image seam correction technique used for correction between adjacent vibration mirror modules for correction between adjacent optical scanning units.

Figure 21:
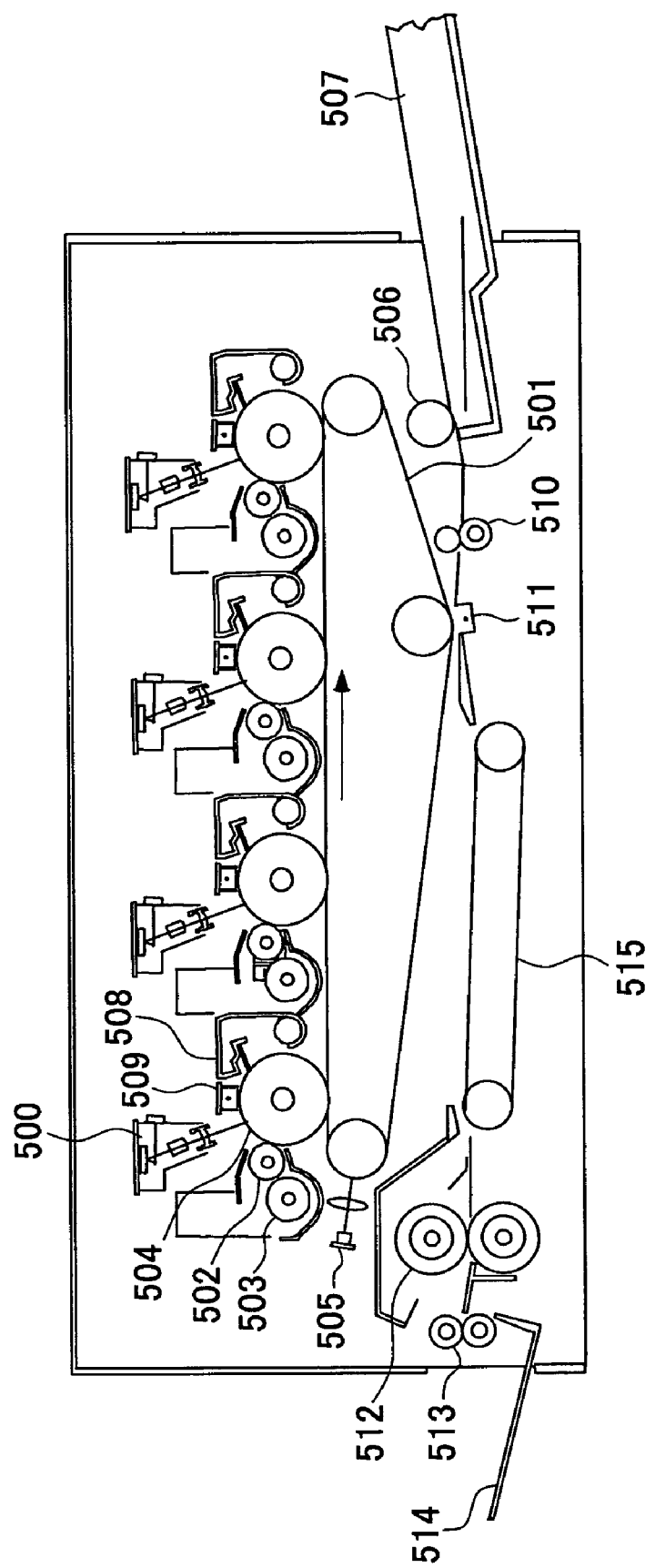
FIG. 21 is a cross-sectional view of the image reproducing and forming apparatus according to an embodiment of the invention.

FIG. 21 is a schematic diagram of the image reproducing/forming apparatus according to an embodiment of the invention. The image reproducing/forming apparatus is a tandem-type color laser printer using four photosensitive drums 504 and four optical scanning units 500 described above. Each of the optical scanning units 500 forms a single color image on the associated photosensitive drum 504. As the transfer belt 501 rotates, the four color images are superposed on the transfer belt 501. In this example, the optical scanning unit is arranged such that the beam emitting direction is downward.

The transfer belt 501 is an intermediate transfer medium, which is supported by a driving roller and two driven rollers. The photosensitive drums 504 are arranged at a uniform interval in the moving direction of the transfer belt 501. Around each of the photosensitive drums 504 are integrally arranged a charging unit 509, a developing unit, and a cleaning unit 508. The developing unit has a developing roller 502 for supplying toner of one of yellow, magenta, cyan, and black, and a toner hopper 503. The cleaning unit 508 has a blade for scratching off the remaining toner after transfer of the toner image.

Each of the latent images corresponding to one of the four colors is formed by the associated optical scanning unit 500 at a different writing start timing in the slow scan direction, upon a trigger of a signal supplied from the sensor 505 for detecting the registration mark formed at the end of the transfer belt 501 (which corresponds to the registration mark offset detection means 629 shown in FIG. 17). The latent image is developed into a toner image by the developing unit, which toner image is transferred to the transfer belt 501 and superposed on the previously transferred images.

A paper or a recording medium is supplied from the paper feed tray 507 by the paper feed roller 506. The paper is fed by the registration roller 510 at a timing of image formation of the fourth color image. A four-color image is transferred from the transfer belt 501 onto the paper at the transfer unit 511. The paper bearing the toner image is transported by the transport belt 515 to the fixing unit 512. The transferred toner image is fixed onto the paper by the fixing roller, and the printed paper is ejected onto the catch tray 514.

The optical scanning units 500 form a line of an image by connecting multiple scanning lines created by the respective optical scanning means. The total number L of dots that defines a line image is divided by three. Dots 1 through L1 are assigned to the first section starting from the end of the line image, dots L1+1 through L2 are assigned to the second section, and dots L2+1 through L are assigned to the third section. In this embodiment, an overlapped area is provided between two adjacent scanning sections so as to overlap each other by several millimeters on the photosensitive drum. The number of dots L1 and L2 are not fixed, but varies among colors to prevent the seams of the scanning lines of each color from being conspicuous at the border of the scanning areas.

The pixel data are divided into three portions in the fast scan direction. Each portion of the pixel data is stored in the bit map memory of the corresponding optical scanning means, and developed into raster data for the corresponding vibrating mirror module, which are stored as line data in a buffer. The stored line data are read out, triggered by a sync detection signal, and reproduced as an image. The writing timming may be set for each portion of the pixel data to align with the registration mark on the writing start end, as described below.

In this embodiment, although the resonance peak may differ among the vibrating mirrors, the sweep angles can be consistent with each other in a prescribed frequency band by varying the gain of the applied voltage. Consequently, the scanning operation can be implemented at the same driving frequency.

The spring constant K may change due to a change in the environmental temperature, and the resonant band may shift all together. When selecting the driving frequency again in response to such a change, a common driving frequency is given to all the vibrating mirror modules, and the registration of each scanning line can be consistent to the end of the scanning area.

Figure 22:
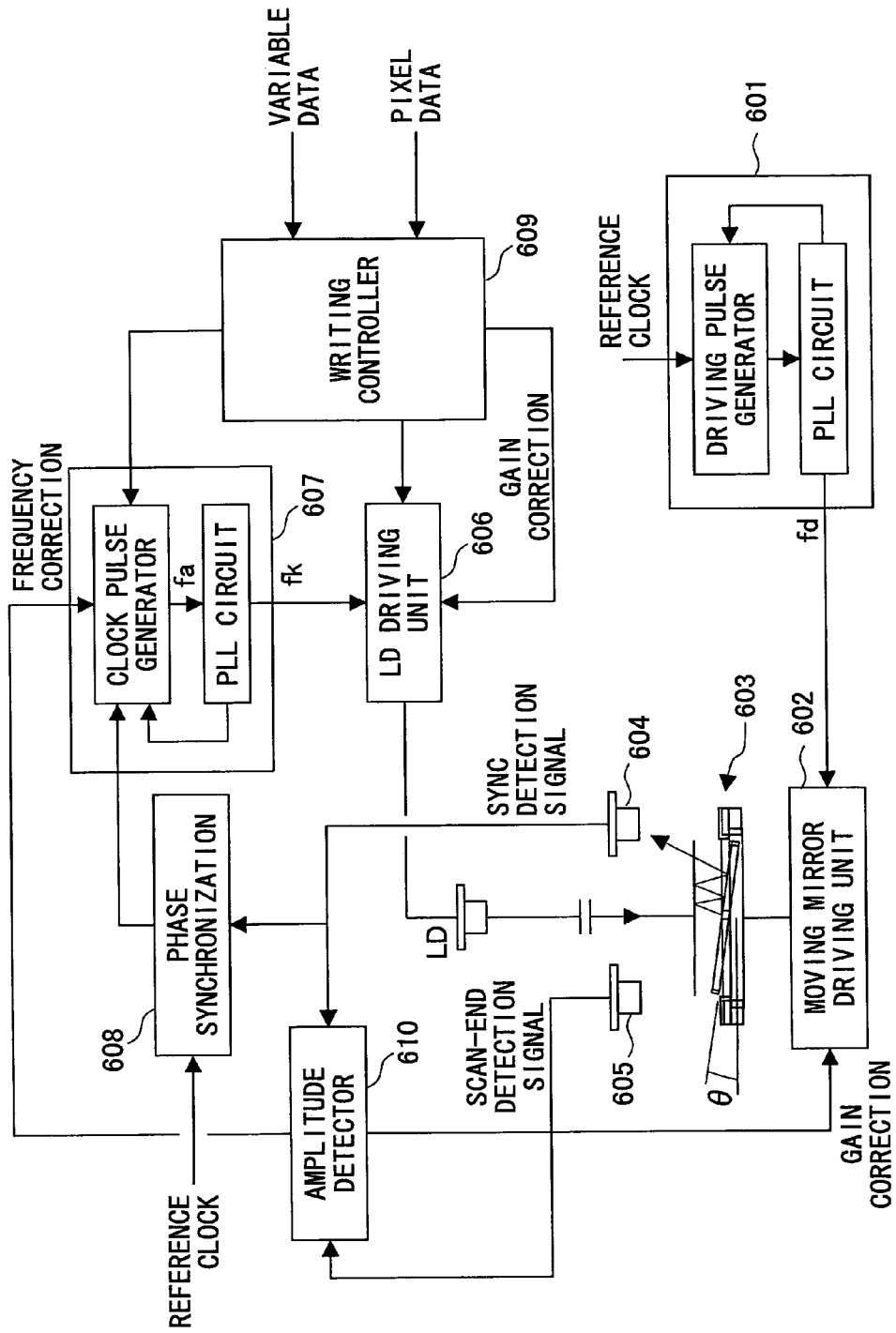
FIG. 22 is a block diagram showing an example of the driving control system for controlling the semiconductor laser and the vibrating mirror.

FIG. 22 is a block diagram showing an example of a control system for driving the semiconductor laser and the vibrating mirror (or the moving mirror). The driving pulse generating unit 601 divides the reference clock by a programmable divider, and generates a sequence of pulses such that a voltage pulse is applied at timing corresponding to the oscillation of the moving mirror 603. The PLL circuit of the pulse generating unit 601 gives a predetermined phase delay δ between the vibrating mirror modules. The phase adjusted pulses are supplied to the moving mirror driving unit 602, and a voltage is applied to the respective electrodes of the vibrating mirror.

The relative phase delay δ among the vibrating mirrors is expressed using a pitch p of a scanning line.

$$\delta=(1/fd)*[(\Delta y/p)-n]$$

where n is a natural number that satisfies $(\Delta y/p)-n<1$. Under this condition, the positional offset at the seam of the lines becomes an integral multiple. By correcting writing timing every other period of the vibrating mirror, that is, by writing data while shifting n line periods, the registration offset $\Delta y$ in the slow scan direction can be cancelled. Consequently, high image quality can be achieved by preventing positional offset at the seams.

Figure 23:
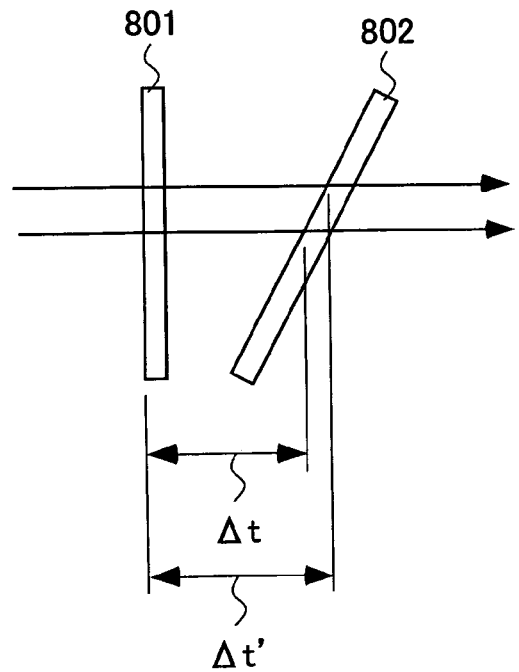
FIG. 23 shows an example of arrangement of the sync detection sensor and the end detection sensor.

In this example, the sync detection sensor 604 and the end detection sensor 605 are provided on the print board. Their detection surfaces are arranged such that the length of the light path becomes the same as the optical path length to the scanned plane. FIG. 23 illustrates the detecting part of the sensor, which includes a photodiode 801 arranged perpendicular to the fast scan direction, and a photodiode 802 arranged so as not to be perpendicular to the fast scan direction. When the beam passes the edge of the perpendicular photodiode 801, a sync detection signal or an end detection signal is generated. By measuring a time difference $\Delta t$ between the photodiode 801 and the photodiode 802, the positional offset $\Delta y$ in the slow scan direction, which is the major factor of the registration offset, can be detected as an estimation corresponding to the offset on the scanned plane (that is, on the photosensitive drum).

The offset Δy can be expressed using a tilt angle γ of the sensor 802 and the scanning speed v of the light beam.

$$\Delta y = (v/\tan\gamma) * \Delta t.$$

If Δt is constant, positional scan offset does not occur. In this embodiment, time difference Δt is monitored at the computing unit to detect the positional scan offset, and the detected time difference is corrected so as to be consistent with the Δt reference value by varying the phase among the vibrating mirror modules.

Concerning the offsets in the fast scan operation, variation in scanning rates among the scanning areas and can be corrected by bringing the sweep angle (or the amplitude) to a prescribed value by adjusting the gain of the voltage pulse applied to each of the vibrating mirrors. In addition, positional offset of the seam between two adjacent scanning areas can be corrected by shifting the pixel clock corresponding to the driving frequency of the moving mirror to vary the magnification of the image width so as to bring the scanning end of an optical scanning unit to the scanning start position of the adjacent optical scanning unit.

Basically, driving voltages are not applied to the vibrating mirror other than during the image recording period and the preparation period. At power-on time and activation time from the waiting state, the dividing ratio is successively varied by the programmable divider to change the driving frequency fd from the higher side for excitation of the mirror. The beam is detected by the sync detection sensor 604 and the end detection sensor 605 that is located near the sweep angle of −θ0. The time difference T between the sync detection signal and the end detection signal is measured by the amplitude detector 610. The sweep angle (amplitude θ0) of the moving mirror can be detected based on the output of the amplitude detector 610.

If the scanning angle θd of the light beam is detected by the sensor, the ratio of θd to the amplitude θ0 is expressed as $$\theta d/\theta 0 = \sin 2\pi * fd * t, \quad t = T/2$$

where fd is the driving frequency of the moving mirror, and t is the scan time from the center of the image.

The sweep angle is corrected by changing the gain of the applied pulse until the time difference T reaches the prescribed reference value T0.

The correction of the sweep angle is carried out constantly under certain environments, for example, between jobs. If the sweep angle is corrected during the recording operation of the image, the end portions of the image along the fast scan line fluctuate. For this reason, the sweep angle is kept constant during the recording operation. The sweep angles of the respective vibrating mirrors are made consistent with each other by selecting a common driving frequency and by setting a reference value of the gain.

The above-described corrections are carried out in each of the vibrating mirror modules 130 (in this example, three modules). When all the corrections are finished in the respective modules, the printing operation is allowed.

Next, driving control for the semiconductor laser is explained.

As has been described, in order to make the line pitch of the latent image uniform in the reciprocating scan, the beam intensity has to be variable, or alternatively, the pulse width of the beam has to be variable. Therefore, a technique for varying the beam intensity is explained as a first method.

Figure 24:
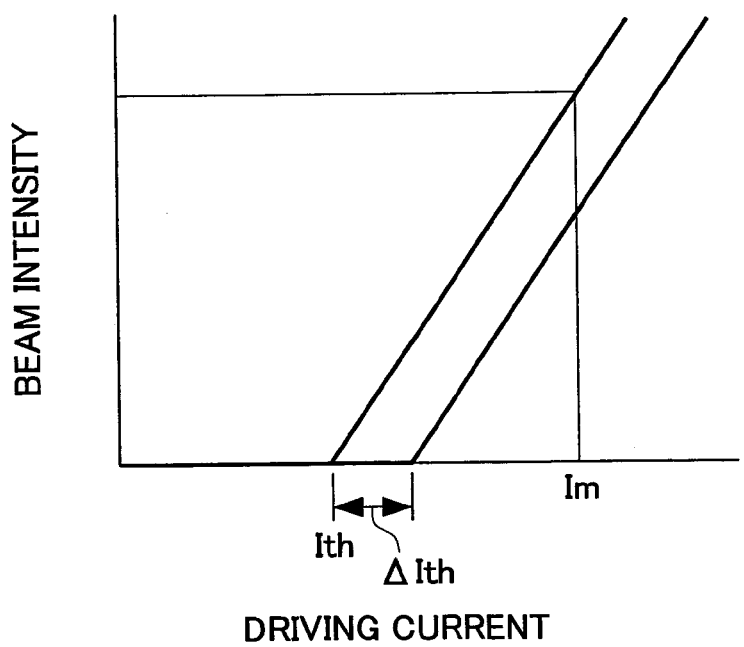
FIG. 24 is a graph of beam intensity as a function of driving current supplied to the semiconductor laser.

FIG. 24 is a graph of the beam intensity as a function of electric current (driving current) applied to the semiconductor laser. The beam intensity increases in proportion to the applied current when the applied current exceeds the threshold level Ith. The difference between the maximum current Im for obtaining the prescribed beam intensity and the threshold current Ith is divided by n (255 in this example), and the driving current is changed in a stepwise manner based on the variable data. As has been explained in connection FIG. 20, the driving current of one of the light-emitting sources is gradually decreased from the maximum current Im to the threshold Ith from the writing start position to the writing end position in the fast scan direction, upon a trigger of the sync detection signal. On the other hand, for the other light-emitting source, the driving current is gradually increased from Ith to Im from the writing start position to the writing end position.

In general, LD driving unit 606 (FIG. 22) carries out feedback control for adjusting the driving current so as to keep the beam intensity constant based on the monitor signal from the semiconductor laser. This is because the threshold Ith and the maximum current Im fluctuate for the same beam intensity, due to temperature change in the casing. Without the feedback control, the beam intensity differs between at a low temperature and a high temperature, which causes the image density to vary.

To avoid this, a change in the driving current Im' that achieves a predetermined output of the monitor signal is always added as the bias ΔIth of the threshold current to the driving current.

Next, the second method, that is, a technique of changing the pulse width (or the pixel clock fm) of the beam is explained.

In the clock pulse generating unit 607 (FIG. 22), the clock pulse generator counts the divided clock produced by dividing the reference clock f0 at the programmable divider, based on the variable data from the writing controller 609, and generates a PLL reference signal fa having a pulse width corresponding to k clocks. The PLL circuit of the clock pulse generating unit 607 selects a phase from the reference clock and outputs the pixel clock fk. As the pulse width is large, the diameter of the latent image increases. The smaller the pulse width, the smaller the latent image is. Accordingly, by changing the pulse width along the fast scan line in a stepwise manner, a latent image with an arbitrary diameter can be formed based on the variable data. For one of the light-emitting sources, the diameter of the latent image is decreased from one-dot size from the writing start position to the writing end position in the fast scan direction, upon a trigger of a sync detection signal. For the other of the light-emitting sources, the diameter is increased to one-dot size from the writing start position to the writing end position.

Since the moving mirror is made to oscillate by resonance, scanning angle θ varies in a sinusoidal way. On the other hand, it is necessary to print dots at a uniform interval in the fast scan direction on the photosensitive drum (as the scanned plane). The imaging characteristic of the scanning lens has to be corrected such that the scanning length per unit scanning angle (dH/dθ) is in proportion to $\sin^{-1}\theta/\theta 0$. In other words, the direction of the light beam has to be corrected such that the scanning speed increases at an accelerated pace from the center toward the end of the image. Since a scanning lens having a power distribution that brings the focusing point away from the center toward the periphery is used, the diameter of the beam spot also increases toward the periphery. Accordingly, increasing the effective scanning range θs with respect to the maximum oscillation θ0 is limited by the requirement for a uniform beam spot.

Figure 25:
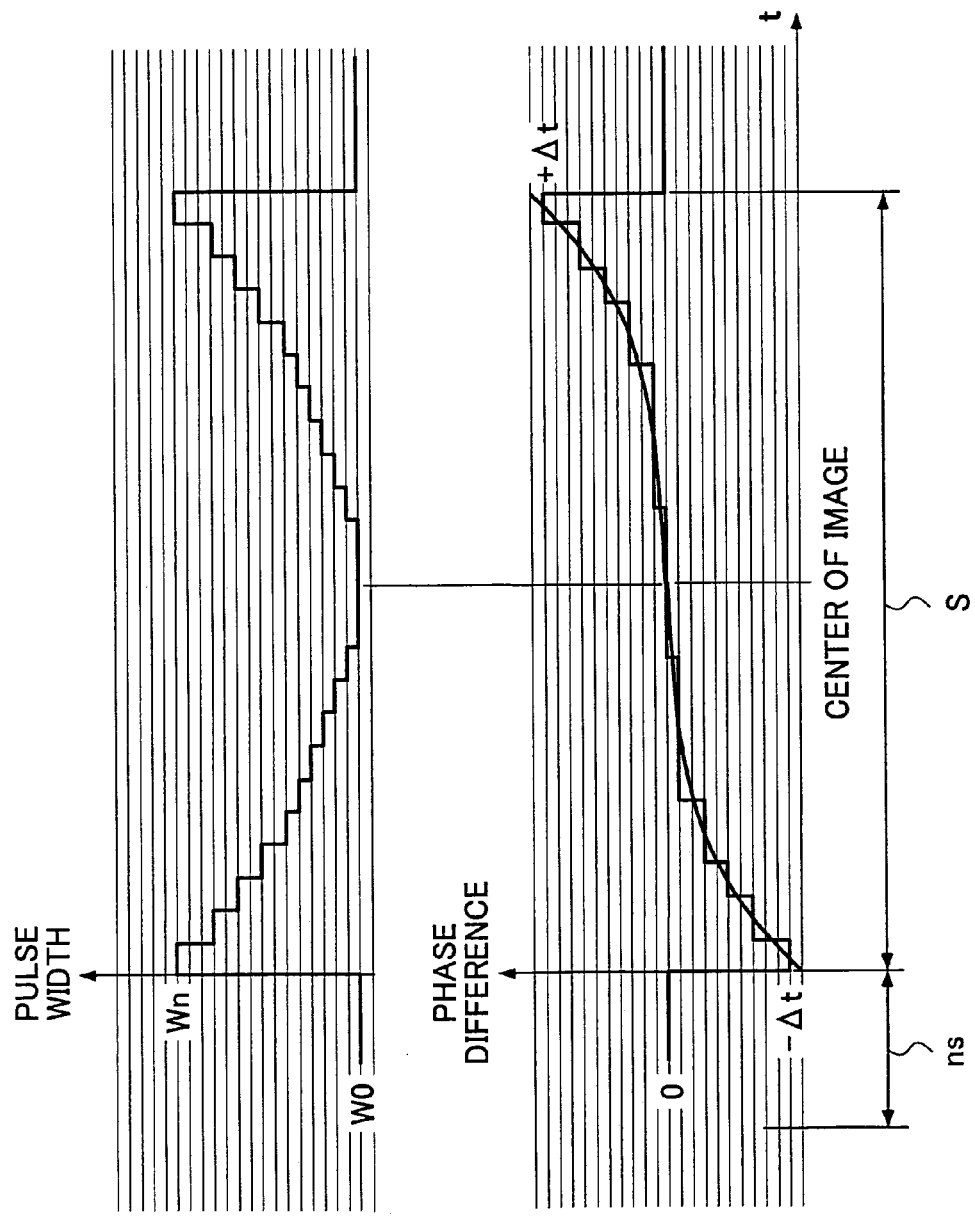
FIG. 25 is a diagram showing pulse width and phase difference with respect to position in the writing (or scanning) direction.

To overcome this problem, in this embodiment, the phase for each pixel is adjusted so as to change from a faster phase to a delayed phase in a stepwise manner from the writing start position to the writing end position, as illustrated in the bottom graph of FIG. 25. At the same time, the pulse width for each pixel is adjusted so as to decrease from the writing stat position to the center and to increase from center to the writing end position in a stepwise manner, as illustrated in the top graph of FIG. 25. Such control can be achieved by a pixel clock fm given to the LD driving unit 606. With this arrangement, the workload of the scanning lens can be reduced by adding electric correction, and the scan efficiency is improved. This control is executed based on regulation of the pulse width and phase so that the dot size (the diameter of the dot) corresponding to a pixel becomes uniform. By producing a pulse with prorated pulse width corresponding to a pixel, variation in the diameter of the latent image can be corrected easily, without adding a new control circuit.

As has been described above, the torsion bar of the vibrating mirror is coupled to the moving mirror at connecting positions offset from the rotational axis by a distance r/2 in opposite directions so as to satisfy r>A/6, where A is the width of the moving mirror perpendicular to the rotational axis. With this arrangement, the rotational driving force propagating through the torsion bar can act on the periphery of the mirror, approaching the center of the distribution of inertial force acting on the mirror substrate. Consequently, the surface deformation can be reduced even if the mirror size increases, and degradation of the imaging performance of the deflected light beam can be prevented.

The torsion bar has a first portion that defines the rotational axis, and a second portion branching from the first portion to the connecting positions. With this arrangement, deformation due to the rotational driving force is absorbed by the second portion of the torsion bar, and therefore, the mirror area extending between the connecting positions is maintained flat.

Preferably, the second portion of the torsion bar extends symmetrically with respect to the first portion, and is coupled to the moving mirror at the connecting positions at end portions thereof. With this arrangement, the rotational driving force is dispersed in the symmetrical second portion, and the torsional displacement is transformed to the vertical displacement of the second portion. Accordingly, the flatness of the mirror portion between the connecting positions can be maintained.

The moving mirror has ribs and hollow portions defined by the ribs. This arrangement can reduce the mass of the mirror substrate, and consequently, the force of inertia decreases. Even if the mirror size is increased, surface deformation is kept small, and degradation of the imaging performance of the deflected beam can be prevented.

The hollow portions are arranged such that the volume of a hollow area located near the end of the moving mirror is greater that that located near the rotational axis of the moving mirror. The mass of the mirror is reduced at the end portion of the moving mirror on which a greater inertial force acts, while rigidity against the distortion propagating from the torsion bar is guaranteed at the center of the moving mirror on which the rotational driving force acts. This arrangement can reduce surface deformation, while preventing degradation of the imaging performance of the deflected beam.

The moving mirror has a first substrate defining a reflecting surface, and a second substrate bonded to the first substrate and to which the torsion bar is coupled. This arrangement can prevent the moving mirror from warping due to the internal stress of the mirror substrate because the two substrates are bonded together such that the stresses of the substrates are balanced. Accordingly, the flatness of the mirror surface can be guaranteed, and the surface accuracy is improved, preventing degradation of the imaging performance of the deflected beam.

Since the first and second substrates are bonded to each other via an intermediate layer that gives a tensile stress to the surface of the bonded substrates, the rigidity against the shearing stress can be improved due to the tensile stress acting on the bonded plane. This arrangement can also reduce surface deformation even if the mirror size is increased, and degradation of the imaging performance of the deflected beam can be prevented.

With a vibrating mirror module using the above-described vibrating mirror, the mirror swinging space can be maintained in the depressurized state inside the housing. Accordingly, the viscosity resistance force on the mirror substrate can be reduced. In addition, variation in resonant frequency due to dust or foreign particles becoming attached to the mirror substrate is reduced, and the scanning frequency can be kept stable.

With an optical scanning unit using the above-described vibrating mirror, surface deformation of the moving mirror can be prevented even at a large sweep angle, and the angle of view is widened, while reducing the optical path length. Consequently, the optical system can be made compact.

With an optical scanner employing a plurality of the above-described optical scanning units, line images formed by the respective optical scanning units are connected in the fast scan direction to form an image. Since the image recording width of each of the optical scanning units is made small depending on the number of the divided sections, the optical scanning unit can be further made compact, while maintaining the scanning accuracy.

An image reproducing and forming apparatus using the above-described optical scanning unit or optical scanner can form an electrostatic latent image on the photosensitive drum with less power consumption because the optical system of the optical scanning unit is compact, requiring less driving power.

This patent application is based on and claims the benefit of the earlier filing date of Japanese Patent Application No. 2003-188161, filed Jun. 30, 2003, the entire contents of which are hereby incorporated by reference.

The invention claimed is:

1. A vibrating mirror comprising:
   a moving mirror configured to deflect a light beam;
   a torsion bar coupled to the moving mirror and defining a rotational axis of the moving mirror; and
   a mirror driving part configured to produce a rotational force for causing the moving mirror to oscillate,
   wherein the torsion bar is coupled to the moving mirror at connecting positions offset from the rotational axis by a distance r/2 in opposite directions so as to satisfy r>A/6, where A is the width of the moving mirror perpendicular to the rotational axis and r is a distance between the connecting positions.

2. The vibrating mirror of claim 1, wherein the torsion bar has a first portion that defines the rotational axis, and a second portion branching from the first portion to the connecting positions.

3. The vibrating mirror of claim 2, wherein the second portion of the torsion bar extends symmetrically with respect to the first portion, and is coupled to the moving mirror at the connecting positions at end portions thereof.

4. The vibrating mirror of claim 2, wherein the torsion bar is T-shaped, and the second portion extends perpendicular to the rotational axis of the moving mirror with a slit between the second portion and the moving mirror.

5. The vibrating mirror of claim 2, wherein the torsion bar is Y-shaped, and the second portion is coupled to the moving mirror at the connecting positions at end portions thereof.

6. The vibrating mirror of claim 1, wherein the moving mirror has ribs and hollow areas defined by the ribs.

7. The vibrating mirror of claim 6, wherein the hollow areas are arranged such that the volume of a hollow area located near the end of the moving mirror is greater that that located near the rotational axis of the moving mirror.

8. The vibrating mirror of claim 1, wherein the moving mirror has a first substrate defining a reflecting surface, and a second substrate bonded to the first substrate and to which the torsion bar is coupled.

9. The vibrating mirror of claim 8, wherein the first and second substrates are bonded to each other via an intermediate layer that gives a tensile stress to the surface of the bonded substrates.

10. A vibrating mirror module comprising:
a vibrating mirror including a moving mirror configured to deflect a light beam;
a torsion bar coupled to the moving mirror and defining a rotational axis of the moving mirror; and
a mirror driving part configured to produce a rotational force for causing the moving mirror to oscillate,
wherein the torsion bar is coupled to the moving mirror at connecting positions offset from the rotational axis by a distance r/2 in opposite directions so as to satisfy r>A/6, where A is the width of the moving mirror perpendicular to the rotational axis; and is a distance between the connecting positions; and
a housing accommodating the vibrating mirror and sealed so as to maintain a pressure in the housing at least lower than atmospheric pressure.

11. The vibrating mirror module of claim 10, wherein the housing has a transparent window through which a light beam is guided onto and from the moving mirror, and a terminal connected to the mirror driving part.

12. An optical scanning unit including:
a light source configured to emit a light beam;
a vibrating mirror configured to deflect the light beam; and
an imaging unit configured to focus the light beam deflected from the vibrating mirror onto a scanned plane, the vibrating mirror comprising:
a moving mirror configured to deflect the light beam;
a torsion bar coupled to the moving mirror and defining a rotational axis of the moving mirror; and
a mirror driving part configured to produce a rotational force for causing the moving mirror to oscillate,
wherein the torsion bar is coupled to the moving mirror at connecting positions offset from the rotational axis by a distance r/2 in opposite directions so as to satisfy r>A/6, where A is the width of the moving mirror perpendicular to the rotational axis r is a distance between the connecting positions.

13. An optical scanner employing a plurality of optical scanning units arranged such that each of the optical scanning units defines a scanning area along a scanning direction and that the scanning areas are connected in the scanning direction to form an image, each of the optical scanning units including a light source configured to emit a light beam, a vibrating mirror configured to deflect the light beam, and an imaging unit configured to focus the light beam deflected by the vibrating mirror onto a scanned plane, the vibrating mirror comprising:
a moving mirror configured to deflect the light beam;
a torsion bar coupled to the moving mirror and defining a rotational axis of the moving mirror; and
a mirror driving part configured to produce a rotational force for causing the moving mirror to oscillate,
wherein the torsion bar is coupled to the moving mirror at connecting positions offset from the rotational axis by a distance r/2 in opposite directions so as to satisfy r>A/6, where A is the width of the moving mirror perpendicular to the rotational axis and r is a distance between the connecting positions.

14. An image reproducing and forming apparatus including:
an image carrier;
a latent image forming unit configured to form a latent image on the image carrier;
a developing unit configured to develop the latent image into a toner image; and
a transfer unit configured to transfer the toner image onto a recording medium, wherein the latent image forming unit includes a light source configured to emit a light beam, a vibrating mirror configured to deflect the light beam, and an imaging unit configured to focus the light beam deflected by the vibrating mirror onto a scanned plane, the vibrating mirror comprising:
a moving mirror configured to deflect the light beam;
a torsion bar coupled to the moving mirror and defining a rotational axis of the moving mirror; and
a mirror driving part configured to produce a rotational force for causing the moving mirror to oscillate,
wherein the torsion bar is coupled to the moving mirror at connecting positions offset from the rotational axis by a distance r/2 in opposite directions so as to satisfy r>A/6, where A is the width of the moving mirror perpendicular to the rotational axis and r is a distance between the connecting positions.

* * * * *